United States Patent
Nakao et al.

(10) Patent No.: US 8,417,067 B2
(45) Date of Patent: Apr. 9, 2013

(54) IMAGING APPARATUS, IMAGE PROCESSING APPARATUS, IMAGE PROCESSING METHOD, AND COMPUTER PROGRAM

(75) Inventors: Daisuke Nakao, Tokyo (JP); Naoya Katoh, Chiba (JP)

(73) Assignee: Sony Corporation, Tokyo (JP)

( * ) Notice: Subject to any disclaimer, the term of this patent is extended or adjusted under 35 U.S.C. 154(b) by 1130 days.

(21) Appl. No.: 11/516,577

(22) Filed: Sep. 7, 2006

(65) Prior Publication Data

US 2007/0052819 A1 Mar. 8, 2007

(30) Foreign Application Priority Data

Sep. 7, 2005 (JP) ................................ P2005-258832

(51) Int. Cl.
*G06K 9/54* (2006.01)
(52) U.S. Cl. ...................... 382/305; 382/312; 348/231.2
(58) Field of Classification Search .................. 382/305, 382/312; 348/231.2
See application file for complete search history.

(56) References Cited

U.S. PATENT DOCUMENTS

| | | | | |
|---|---|---|---|---|
| 5,431,161 A | * | 7/1995 | Ryals et al. | 600/425 |
| 6,137,534 A | * | 10/2000 | Anderson | 348/222.1 |
| 6,493,028 B1 | * | 12/2002 | Anderson et al. | 348/222.1 |
| 6,839,064 B2 | * | 1/2005 | Nakami | 345/556 |
| 6,956,671 B2 | * | 10/2005 | Monty et al. | 358/1.9 |
| 6,964,025 B2 | * | 11/2005 | Angiulo et al. | 715/838 |
| 7,015,959 B1 | * | 3/2006 | Morita | 348/231.9 |
| 7,259,786 B2 | * | 8/2007 | Shimizu | 348/231.6 |
| 7,336,817 B2 | * | 2/2008 | Kasperkiewicz et al. | 382/162 |
| 7,453,498 B2 | * | 11/2008 | Prentice et al. | 348/222.1 |
| 7,457,483 B2 | * | 11/2008 | Tokiwa | 382/298 |
| 7,548,247 B2 | * | 6/2009 | Kotani | 345/619 |
| 7,609,301 B2 | * | 10/2009 | Kaku | 348/231.2 |
| 7,884,863 B2 | * | 2/2011 | Nakami et al. | 348/241 |
| 8,238,689 B2 | * | 8/2012 | Inoue | 382/274 |
| 8,295,650 B2 | * | 10/2012 | Ueno et al. | 382/305 |
| 2003/0184652 A1 | * | 10/2003 | Tanaka et al. | 348/207.1 |
| 2004/0105107 A1 | * | 6/2004 | Takahashi | 358/1.9 |
| 2004/0119841 A1 | | 6/2004 | Shimizu | |
| 2004/0196388 A1 | | 10/2004 | Kaku | |
| 2004/0227824 A1 | * | 11/2004 | Takahashi | 348/234 |
| 2005/0007610 A1 | * | 1/2005 | Kawase et al. | 358/1.9 |
| 2005/0128316 A1 | * | 6/2005 | Sugimori | 348/223.1 |
| 2005/0174449 A1 | | 8/2005 | Matsuzaka | |
| 2005/0175260 A1 | * | 8/2005 | Takahashi | 382/309 |
| 2005/0196040 A1 | * | 9/2005 | Ohara | 382/167 |
| 2006/0125922 A1 | * | 6/2006 | Albert et al. | 348/207.11 |

FOREIGN PATENT DOCUMENTS

| | | |
|---|---|---|
| EP | 0 825 758 A2 | 2/1998 |
| EP | 1 271 404 A21 | 1/2003 |
| JP | 2004-129065 | 4/2004 |
| JP | 2004129065 * | 4/2004 |
| WO | WO 91/14334 | 9/1991 |
| WO | WO9114334 * | 9/1991 |

OTHER PUBLICATIONS

European Search Report in EP 06 01 7446, dated Dec. 2, 2009.
Office Action in European Application No. 06017446.3-2202, dated Apr. 30, 2012 (4 pages).

* cited by examiner

*Primary Examiner* — Jayesh A Patel
(74) *Attorney, Agent, or Firm* — Finnegan, Henderson, Farabow, Garrett & Dunner, LLP

(57) ABSTRACT

An imaging apparatus, an image processing method and a computer program are provided. An imaging apparatus includes: an imaging part; and a data processing part which executes a process to create a RAW image file that stores RAW data acquired through the imaging part and a plurality of parameter sets to be applied to a development process of the RAW data and which executes a process to store the file in a storage part.

12 Claims, 16 Drawing Sheets

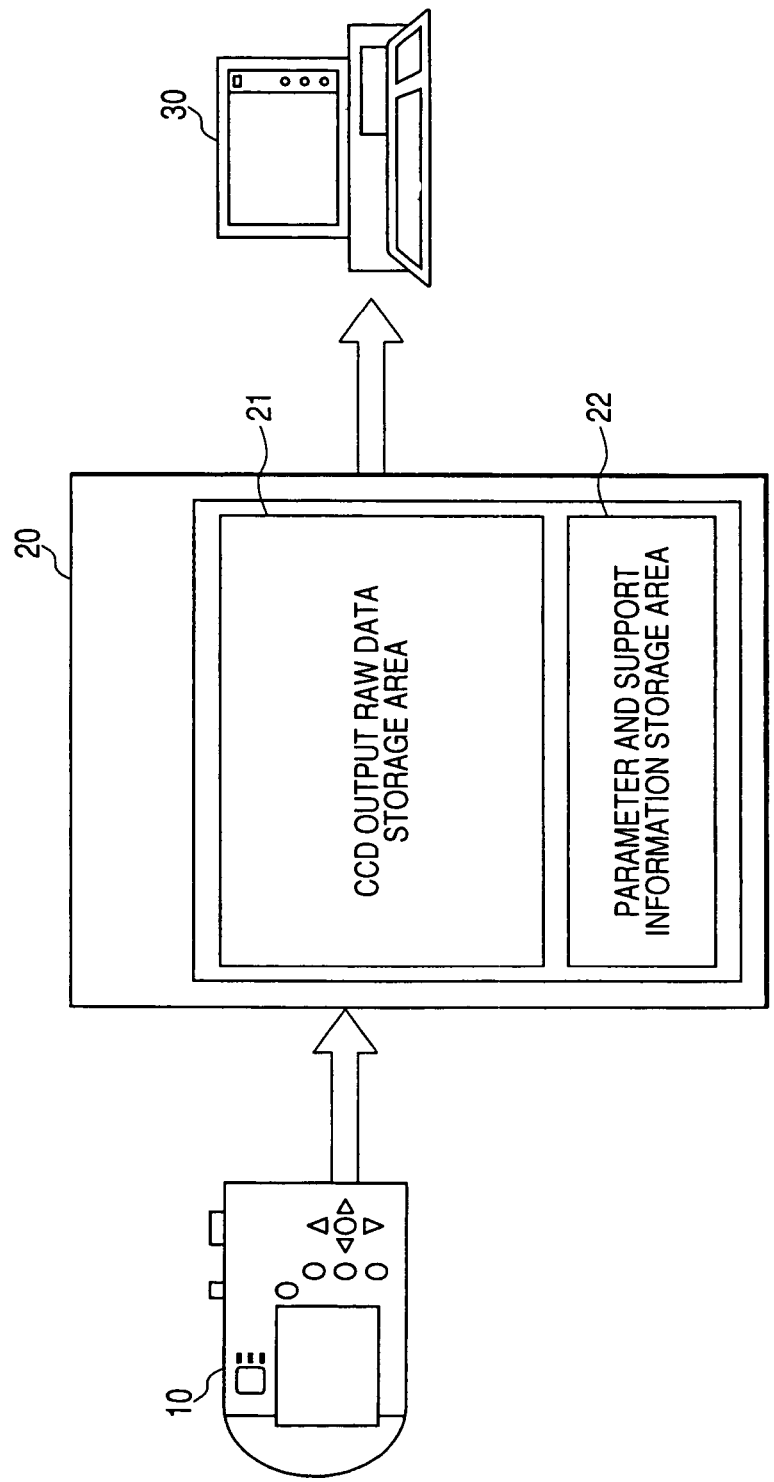

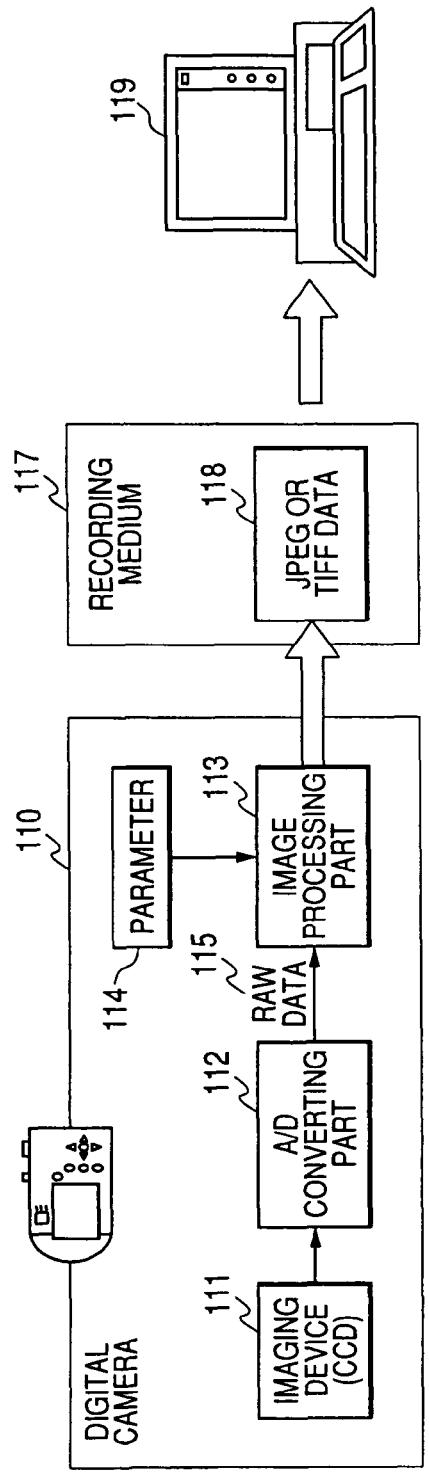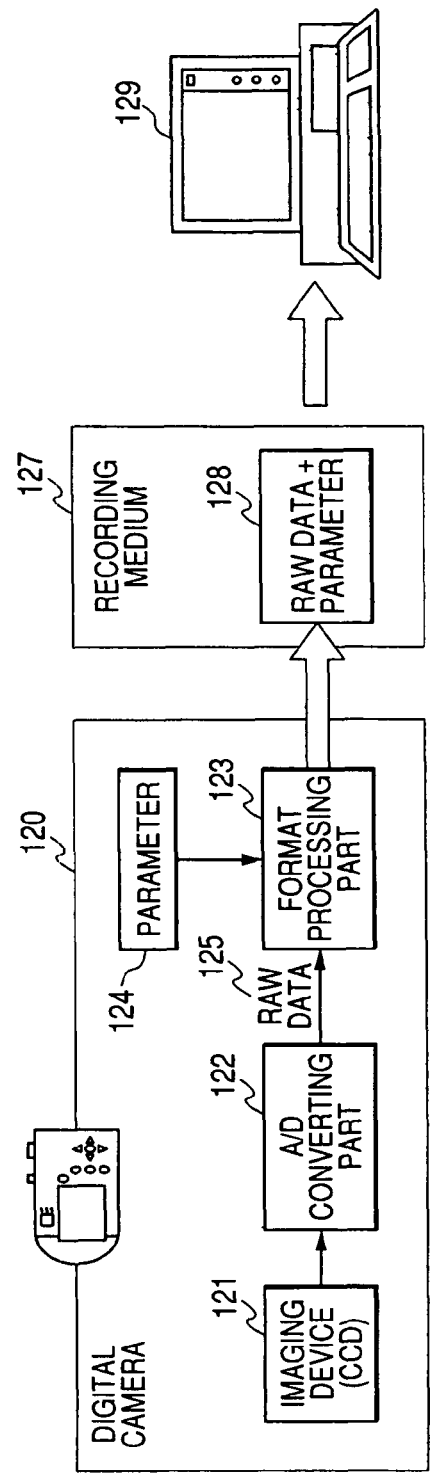

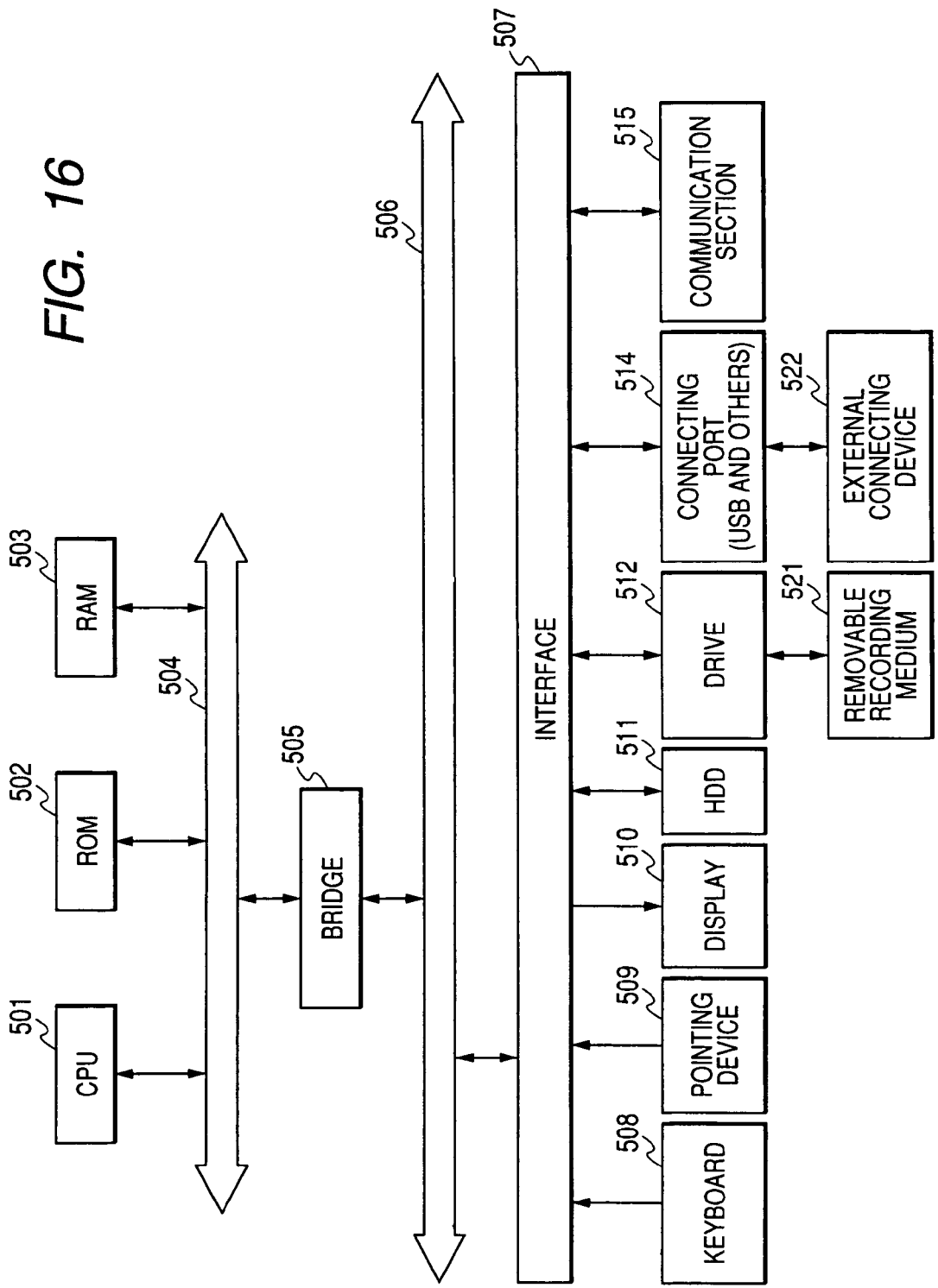

IMAGING APPARATUS, IMAGE PROCESSING APPARATUS, IMAGE PROCESSING METHOD, AND COMPUTER PROGRAM

CROSS REFERENCES TO RELATED APPLICATIONS

The present invention contains subject matter related to Japanese Patent Application JP 2005-258832 filed in the Japanese Patent Office on Sep. 7, 2005, the entire contents of which being incorporated herein by reference.

BACKGROUND OF THE INVENTION

1. Field of the Invention

The present invention relates to an imaging apparatus, an image processing apparatus, an image processing method, and a computer program. More specifically, for example, the invention relates to an imaging apparatus, an image processing apparatus, an image processing method, and a computer program, which process and store RAW data that is taken by an imaging apparatus such as a digital camera and does not undergo signal processing with parameters.

2. Description of the Related Art

In recent years, with the wide spread of digital cameras and information processing units such as a personal computer (PC) which can process images, a process can be done easily in such a way that an image taken by a digital camera is captured into an image processing apparatus such as a PC, a program for image processing installed in the image processing apparatus is used to edit and process data of the image taken by the digital camera, the data is displayed on a display as an image adapted to user's tastes, and the image is outputted through a printer.

For a processing form in the case in which an image taken by a digital camera is captured into an apparatus such as a PC, there are a form in which image data is processed based on predetermined parameters set in the digital camera, such as parameters for brightness, color tones, white balance, contrast and sharpness, data is formed in the JPEG format or the TIFF format, for example, and then the data is captured into an apparatus such as a PC, and a method in which data is taken by an imaging device such as a CCD of a digital camera, RAW image data is captured into an apparatus such as a PC with no image processing based on these parameters and no signal processing based on various parameters, and image processing is done on the PC.

A RAW image is data before camera signal processing, and is equivalent to a negative film for a film camera. The RAW image undergoes image processing in various ways to obtain an objective image. Image processing to obtain an objective image from a RAW image is also called a development process. For many pieces of digital imaging apparatus such as a digital still camera, many of them create and output an image that preset parameters are applied to finish a development process, for example, data in the JPEG format and the TIFF format described above.

However, the development process based on the parameters provided by a camera manufacturer may not be matched with a process desired by a user all the time. There is a growing demand that various parameters used for a development process (hereinafter, referred to as a development parameter set) are adjusted to do desired development to obtain an objective image of higher quality. In this trend, various manufacturers offer. Digital still cameras that can output a RAW image file and RAW data development software packages that can perform a sophisticated development process.

In the configuration allowing a process to which RAW data is applied, for example, as shown in FIG. 1, a digital camera 10 stores data in a predetermined file format in a memory card 20 such as a flash memory mounted on the digital camera 10. For example, RAW data is stored in a RAW data storage area 21, and a predefined specific parameter set and support information corresponding to the stored RAW data are stored in a parameter and support information storage area 22. In addition, for a data storage unit, it is not limited to the flash memory, which may be a storage medium such as a hard disk drive and a DVD, or may be configured to use an external storage connected to a network.

An image processing apparatus 30 such as a PC which implements image processing reads RAW data, parameters and support information out of the memory card 20 for image processing. Alternatively, a process can be done in such a way that the parameters set on the image processing apparatus 30 side are used for image processing (a development process) to store a developed image in a storage part on the image processing apparatus 30 side.

However, the development process is a highly complicated process, and a resulted image is greatly varied depending on the combinations of the ways of the development process and the parameters for use. A user has to create a suitable development parameter set in accordance with his/her purpose as occasion demands for creating a desired image. In addition, information such as the rotation of an image, a color space for use, the scaling of the image, a title and attributes (hereinafter, referred to as support information) is also important to create an objective image.

In the development process, a user can apply a parameter set and support information suitable for his/her tastes for image processing (the development process), and create a developed image to record the developed image created in a memory. However, the parameter set and the support information applied at this time are not held separately. For example, a process may not be done in such a way that a different parameter set and support information are applied to a single item of RAW image data to efficiently create images in different forms.

Some of existing RAW image file formats can leave a development adjustment history, but they may not separately hold development parameter sets and support information depending on purposes. Therefore, for example, it is inconvenient in the case in which different parameter sets are applied to a single RAW image depending on a plurality of purposes for development. In addition, there is a camera that can apply a specific parameter set for processing to develop an image when taken and can store the developed image along with RAW data at the same time. However, the developed image is only one image to which the specific parameter set is applied, and a process may not be done in such a way that a plurality of different developed images are acquired at the same time to which different parameter sets are applied.

SUMMARY OF THE INVENTION

The invention has been made in view of the circumstances. It is desirable to provide an imaging apparatus, an image processing apparatus, an image processing method, and a computer program, which can efficiently create different developed images by selectively applying various parameter sets and support information depending on user's purposes and tastes by adapting a file format which can set and store a plurality of different parameter sets and different items of support information applicable to RAW image data as image data that is captured by a digital camera as an imaging apparatus.

An embodiment of the invention is an imaging apparatus including: an imaging part; and a data processing part which executes a process to create a RAW image file that stores RAW data acquired through the imaging part and a plurality of parameter sets to be applied to a development process of the RAW data and which executes a process to store the file in a storage part.

Furthermore, in the imaging apparatus according to an embodiment of the invention, the data processing part has a configuration to execute a development process in which a plurality of the different parameter sets are applied to the RAW data to create a developed image or an in-process image, to set a data set which includes the created developed image or the in-process image and the parameter set applied to creation of the image, and to execute a process to store it in the RAW image file.

Furthermore, in the imaging apparatus according to an embodiment of the invention, the data processing part has a configuration to create a thumbnail image corresponding to a developed image or an in-process image created by a development process in which a plurality of the different parameter sets are applied to the RAW data, to set a data set which includes parameter set applied to create the created thumbnail image and an image, and to execute a process to store it in the RAW image file.

Furthermore, in the imaging apparatus according to an embodiment of the invention, the data processing part has a configuration to set a data set which includes the parameter set and support information containing attribute information corresponding to the parameter set, and to execute a process to store it in the RAW image file.

Furthermore, in the imaging apparatus according to an embodiment of the invention, the data processing part has a configuration to execute a development process in which a plurality of the different parameter sets are applied to the RAW data to create a developed image or an in-process image, to set a data set which includes the created developed image or the in-process image and a parameter set corresponding to a development process step different from the development process parameter applied to creation of the image, and to execute a process to store it in the RAW image file.

Furthermore, in the imaging apparatus according to an embodiment of the invention, the data processing part has a configuration to execute a process to create a master file which stores RAW data acquired through the imaging part and a plurality of parameter sets to be applied to a development process of the RAW data and sub-files which separately store the plurality of the parameter sets stored in the master file, and to store it in the storage part.

Furthermore, in the imaging apparatus according to an embodiment of the invention, the data processing part has a configuration to create a sub-file which stores at least any one of the image data created by a development process which applies the parameter set stored in the sub-file and thumbnail image data of the image data.

Furthermore, in the imaging apparatus according to an embodiment of the invention, the data processing part has a configuration to execute a process to store identification information which shows correspondence between the master file and the sub-file.

Furthermore, an embodiment of the invention is an image processing apparatus including: a data input which inputs at least any one of RAW data acquired by the imaging apparatus and a developed image or an in-process image data created by a development process based on the RAW data, and inputs a parameter set to be applied to the development process; and a data processing part which executes an image process that the input parameter set is applied to the RAW data and the developed image or the in-process image and which executes a process to create new image data.

Furthermore, in the imaging apparatus according to an embodiment of the invention, the data processing part has a configuration to execute a reverse process of the development process as an image process in which the input parameter set is applied to the developed image or the in-process image, and to execute a process to create RAW data or analogous RAW data.

Furthermore, an embodiment of the invention is an image processing method including the steps of: imaging; and processing data to create a RAW image file that stores RAW data acquired at the imaging step and a plurality of parameter sets to be applied to a development process of the RAW data and to store the file in a storage part.

Furthermore, in the image processing method according to an embodiment of the invention, the data processing step executes a development process in which a plurality of the different parameter sets are applied to the RAW data to create a developed image or an in-process image, sets a data set which includes the created developed image or the in-process image and the parameter set applied to creation of the image, and executes a process to store it in the RAW image file.

Furthermore, in the image processing method according to an embodiment of the invention, the data processing step creates a thumbnail image corresponding to a developed image or an in-process image created by a development process in which a plurality of the different parameter sets are applied to the RAW data, sets a data set which includes parameter set applied to create the created thumbnail image and an image, and executes a process to store it in the RAW image file.

Furthermore, in the image processing method according to an embodiment of the invention, the data processing step sets a data set which includes the parameter set and support information containing attribute information corresponding to the parameter set, and executes a process to store it in the RAW image file.

Furthermore, in the image processing method according to an embodiment of the invention, the data processing step executes a development process in which a plurality of the different parameter sets are applied to the RAW data to create a developed image or an in-process image, sets a data set which includes the created developed image or the in-process image and a parameter set corresponding to a development process step different from the development process parameter applied to creation of the image, and executes a process to store it in the RAW image file.

Furthermore, in the image processing method according to an embodiment of the invention, the data processing step executes a process to create a master file which stores RAW data acquired through the imaging part and a plurality of parameter sets to be applied to a development process of the RAW data and sub-files which separately store the plurality of the parameter sets stored in the master file, and to store it in the storage part.

Furthermore, in the image processing method according to an embodiment of the invention, the data processing step creates a sub-file which stores at least any one of the image data created by a development process which applies the parameter set stored in the sub-file and thumbnail image data of the image data.

Furthermore, in the image processing method according to an embodiment of the invention, the data processing step executes a process to store identification information which shows correspondence between the master file and the sub-file.

Furthermore, an embodiment of the invention is an image processing method including the steps of: inputting data to input at least any one of RAW data acquired by the imaging apparatus and a developed image or an in-process image data created by a development process based on the RAW data, and to input a parameter set to be applied to the development process; and processing data to execute an image process that the input parameter set is applied to the RAW data and the developed image or the in-process image and to execute a process to create new image data.

Furthermore, in the image processing method according to an embodiment of the invention, the data processing step executes a reverse process of the development process as an image process which applies the input parameter set to the developed image or the in-process image, and executes a process to create RAW data or analogous RAW data.

Furthermore, an embodiment of the invention is a computer program which allows an imaging apparatus to execute image data acquisition and memory storage, the computer program including instructions to execute: imaging; and processing data to create a RAW image file that stores RAW data acquired at the imaging step and a plurality of parameter sets to be applied to a development process of the RAW data and to store the file in a storage part.

Furthermore, an embodiment of the invention is a computer program which allows an image processing apparatus to execute image processing, the computer program including instructions to execute: inputting data to input at least any one of RAW data acquired by the imaging apparatus and a developed image or in in-process image data created by a development process based on the RAW data, and a parameter set to be applied to the development process; and processing data to execute an image process that the input parameter set is applied to the RAW data and the developed image or the in-process image and to execute a process to create new image data.

In addition, the computer program according to an embodiment of the invention is a computer program which can be offered to a general purpose computer system which can execute various program codes, for example, by a storage medium which offers the program in a computer readable format, a communication medium, a storage medium such as CD, FD and MO, or through a communication medium such as a network. The program like this is provided in the computer readable format to implement the process corresponding to the program on the computer system.

Other purposes, features and advantages of the invention will be apparent from more detailed description based on an embodiment of the invention described later and the accompanying drawings. In addition, in the specification, a system is the configuration of a logical set of a plurality of devices, which is not limited to one that devices of individual configurations are in the same housing.

According to the configuration of an embodiment of the invention, this configuration is done in which a plurality of parameter sets can be stored in the file format of the image data file which stores RAW data corresponding to a subject image acquired through the imaging device. Furthermore, this configuration is done in which the data set is set and stored which associates the developed image or the in-process image corresponding to each of a plurality of parameter sets with the parameters and the sub-file formed only of the data set is created. Therefore, various image data processes can be done efficiently such as creation of an image to which various parameters are applied, or a process to again acquire RAW data by the reverse development process to which the parameter is applied. Processing of the taken image in high convenience can be implemented.

BRIEF DESCRIPTION OF THE DRAWINGS

FIG. 1 shows a diagram illustrative of an image file format which stores RAW data in an imaging apparatus before;

FIGS. 2A and 2B show diagrams illustrative of two forms of an image file created in the imaging apparatus and a process of using the image file in the image processing apparatus;

FIGS. 7-1 and 7-2 show diagrams illustrative of exemplary directory configurations of a master file and a sub-file which are created in the imaging apparatus according to an embodiment of the invention;

FIG. 16 shows a diagram depicting an exemplary hardware configuration of the imaging apparatus according to an embodiment of the invention.

DETAILED DESCRIPTION OF THE INVENTION

Figure 3:
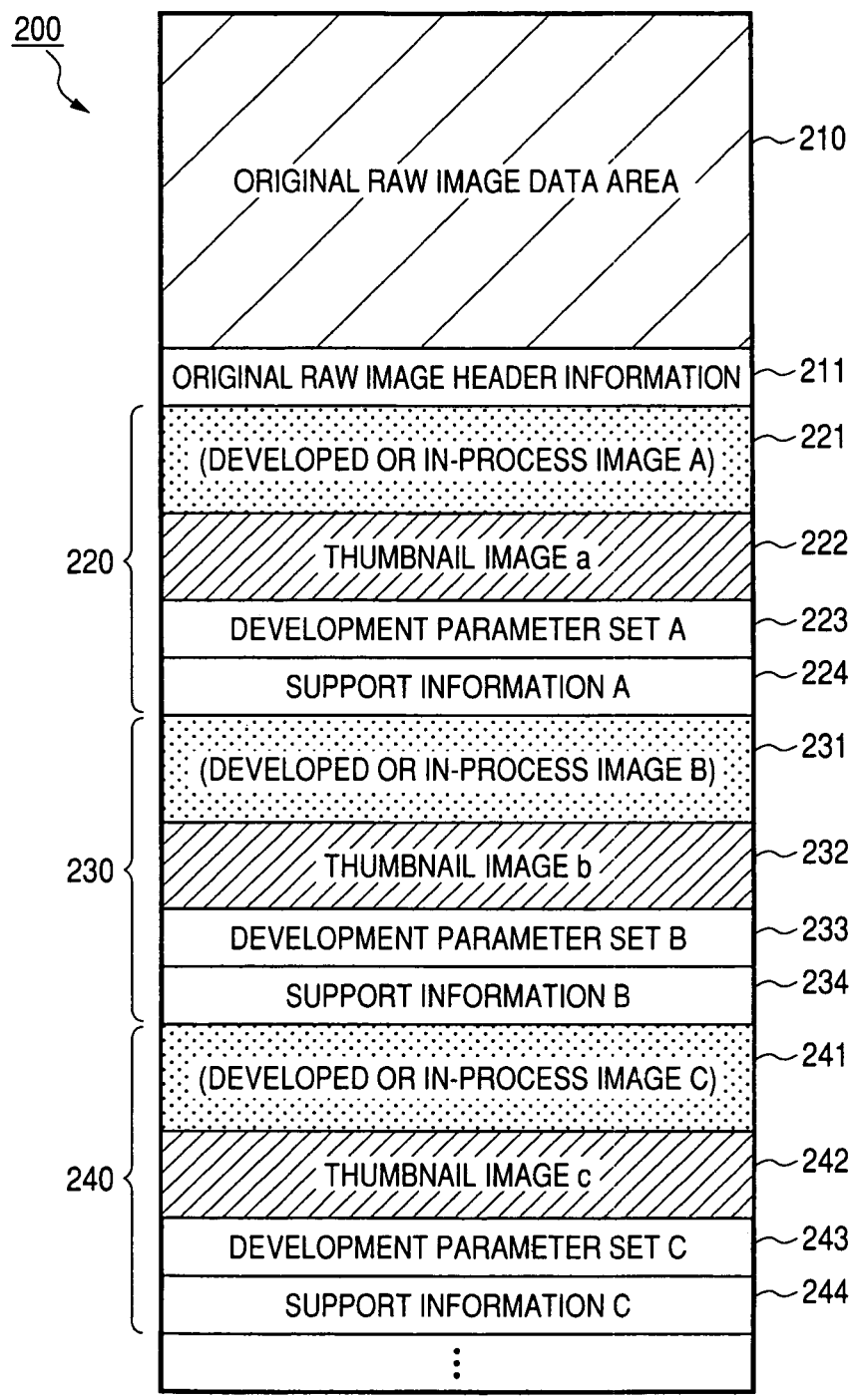
FIG. 3 shows a diagram illustrative of an image file format which stores RAW data in an imaging apparatus according to an embodiment of the invention.

Hereinafter, the detail of an imaging apparatus, an image processing apparatus, an image processing method, and a computer program according to an embodiment of the invention will be described with reference to the drawings.

First, a general data processing configuration in an imaging apparatus will be described with reference to FIGS. 2A and 2B. For a processing form in the case of capturing an image taken by the digital camera into an image processing apparatus such as a PC which executes image processing, there are two processing forms shown in FIGS. 2A and 2B.

A first exemplary process is a process configuration shown in FIG. 2A. A subject image is taken by an imaging device (CCD) 111 of a digital camera 110 which is an imaging apparatus, and the subject image undergoes photoelectric conversion in the imaging device 111 to create an analog electric signal. The created analog electric signal is inputted to an A/D converting part 112, and is converted to a digital signal. RAW data 115 which is digital data is inputted to an image processing part 113. The image processing part 113 executes image processing to which a parameter 114 is applied such as a parameter that is set in accordance with the imaging conditions, or a user setting parameter, and stores data as image data 118 after signal processing in an image format such as a JPEG data format, or a TIFF data format in a recording medium 117 which is configured of a flash memory, for example. In addition, the parameter 114 is a parameter which is configured of parameters to adjust brightness, color tones, white balance, contrast, and sharpness, for example.

An image processing apparatus 119 such as a PC which executes image processing reads the image data 118 after signal processing which is stored in the recording medium 117, and executes processes such as outputting data to a display and outputting data for printing.

A second exemplary process is a process configuration shown in FIG. 2B. A subject image is taken by an imaging device (CCD) 121 of a digital camera 120 which is an imaging apparatus, and the subject image undergoes photoelectric conversion in the imaging device 121 to create an analog electric signal. The created analog electric signal is inputted to an A/D converting part 122, and is converted to a digital signal. RAW data 125 which is digital data is inputted to a format processing part 123. The format processing part 123 takes in the RAW data 125 as well as a parameter 124 such as a parameter that is set in accordance with the imaging conditions or a user setting parameter, creates a file that stores the RAW data 125 and the parameter 124 in accordance with a predetermined file format, and stores it as an image data file 128 which includes the RAW data and the parameter in a recording medium 127 which is configured of a flash memory. In addition, the parameter 124 is a parameter which is configured of parameters to adjust brightness, color tones, white balance, contrast, and sharpness, for example.

An image processing apparatus 129 such as a PC which executes image processing reads the image data file 128 which includes the RAW data and the parameter stored in the recording medium 127, applies the parameter acquired from the image data file to the RAW data read out of the same data file in accordance with a signal processing program which is installed in the image processing apparatus, and executes signal processing to run processes such as outputting data to a display and outputting data for printing.

For the file format of the image data file which is created in writing the RAW data and the parameter set to the recording medium 127, as described above, a predefined specific parameter set which corresponds to the stored RAW data and is applicable thereto, and support information are only stored. It is necessary for a user to run a development process to which this preset parameter set and support information are applied, or the user to set a new parameter on his/her own for processing.

In the configuration of an embodiment of the invention, the digital camera as an imaging apparatus uses a file format shown in FIG. 3 to record various items of data based on a taken image. A RAW image file format shown in FIG. 3 will be described.

In a RAW image file format 200 shown in FIG. 3, the following is stored: an original RAW image data area 210 which is a storage area for RAW image data, original RAW image header information 211 which is formed of various items of RAW attribute information such as information of a camera that are used for taking a RAW image, size information, and date and time information. In addition to these, a plurality of data sets.

In a data set area A 220, the following is stored:
a) A developed or in-process image A 221, which is formed of a developed image to which a specific parameter set A is applied, or an in-process image which is created by applying a specific parameter set A.
b) A thumbnail image a 222, which corresponds to the developed or in-process image A 221.
c) A development parameter set A 223, which is applied to create the developed or in-process image A 221.
d) Support information 224, which corresponds to the developed or in-process image A 221.

The support information 224 is configured of information such as the rotation of the image, a color space for use, the scaling of the image, a title and attributes, which correspond to the developed or in-process image A 221.

Furthermore, in a data set area B 230, the following is stored:
a) A developed or in-process image B 231, which is formed of a developed image to which a specific parameter set B is applied, the specific parameter set B is different from the parameter set A, or an in-process image which is created by applying a specific parameter set B.
b) A thumbnail image b 232, which corresponds to the developed or in-process image B 231, a development parameter set B 233 which is applied to create the developed or in-process image B 231.
c) Support information 234, which corresponds to the developed or in-process image B 231.

Furthermore, in a data set area C 240, the following data is stored:
a) A developed or in-process image C 241, which is formed of a developed image to which a specific parameter set C is applied, the specific parameter set C is different from the parameter sets A and B, or an in-process image which is created by applying the specific parameter set C.
b) A thumbnail image C 242, which corresponds to the developed or in-process image C 241.
c) A development parameter set C 243, which is applied to create the developed or in-process image C 241.
d) Support information 244, which corresponds to the developed or in-process image C 241.

In addition, in the drawing, three types of data sets A, B and C are shown, but the number of data sets is not limited thereto. A given number of data sets can be stored.

Figure 4:
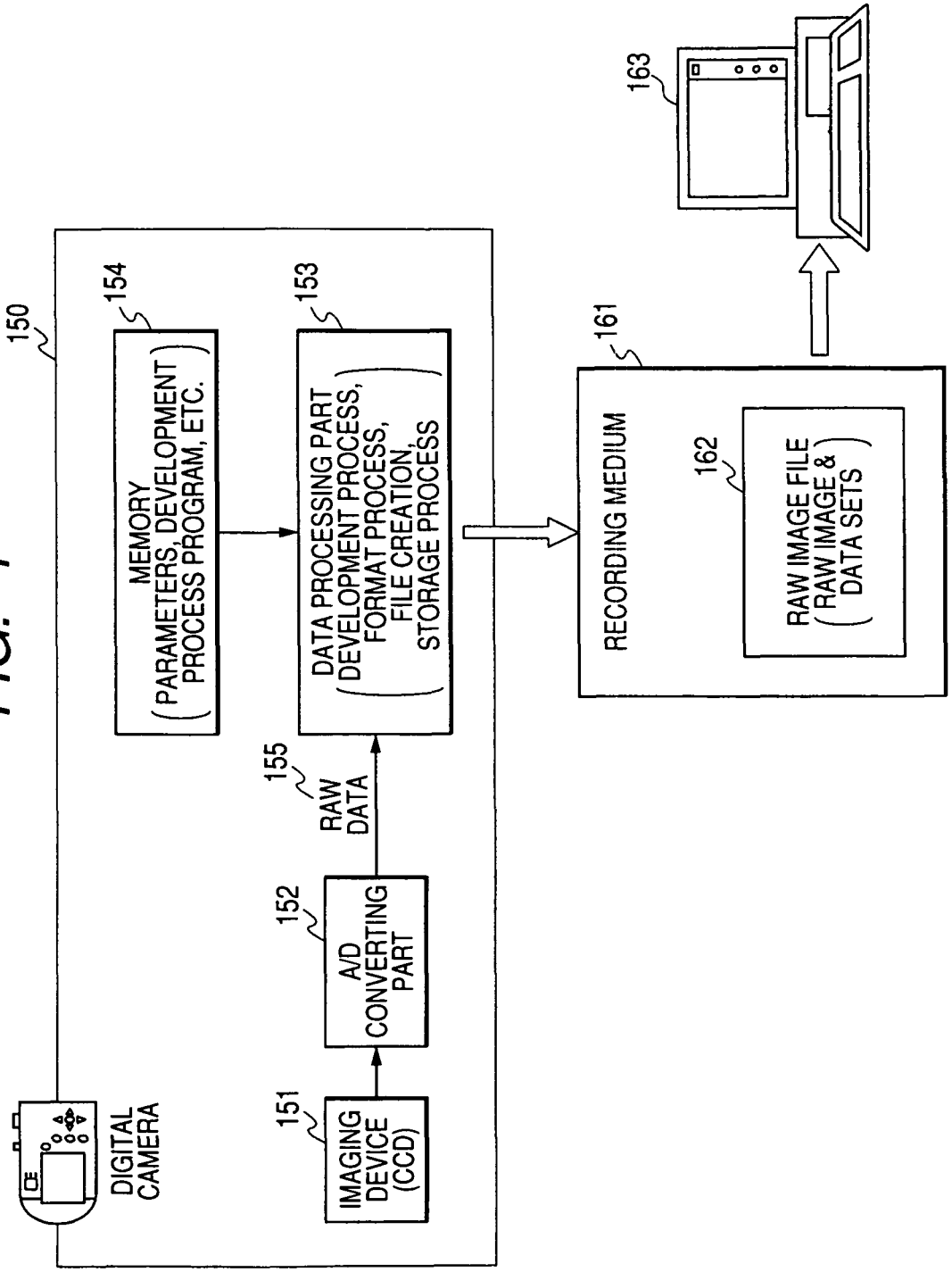
FIG. 4 shows a diagram illustrative of the configuration of and the process of the imaging apparatus according to an embodiment of the invention.

The configuration and process of the imaging apparatus will be described with reference to FIG. 4, which creates a RAW image file in accordance with the RAW image file format shown in FIG. 3 and stores it in a memory. A subject image is taken by an imaging device (CCD) 151 of a digital camera 150 which is an imaging apparatus; and the subject image undergoes photoelectric conversion in the imaging device 151 to create an analog electric signal. The created analog electric signal is inputted to an A/D converting part 152, and is converted to a digital signal. RAW data 155 as digital data is inputted to a data processing part 153.

The data processing part 153 takes in the RAW data 155 as well as reads a plurality of different preset parameter sets out of a memory 154, executes a development process to which each of the parameter sets is applied in accordance with a development process program stored in the memory 154, and creates a plurality of developed images or in-process images. It further creates data such as a thumbnail image to be stored in the file format shown in FIG. 3, creates a RAW image file which is formed of RAW data and a plurality of data sets, and stores a created RAW image file 162 in a recording medium 161 which is configured of a flash memory.

An image processing apparatus 163 such as a PC which executes image processing reads the RAW image file 162 stored in the recording medium 161, and executes a process to which the parameter acquired from the file is applied in accordance with a signal processing program which is installed in the image processing apparatus.

The correspondence between the developed or in-process image which is stored in each of the data set areas in the RAW image file shown in FIG. 3 and the parameter set which is included in the data set will be described with reference to FIG. 5.

Figure 5:
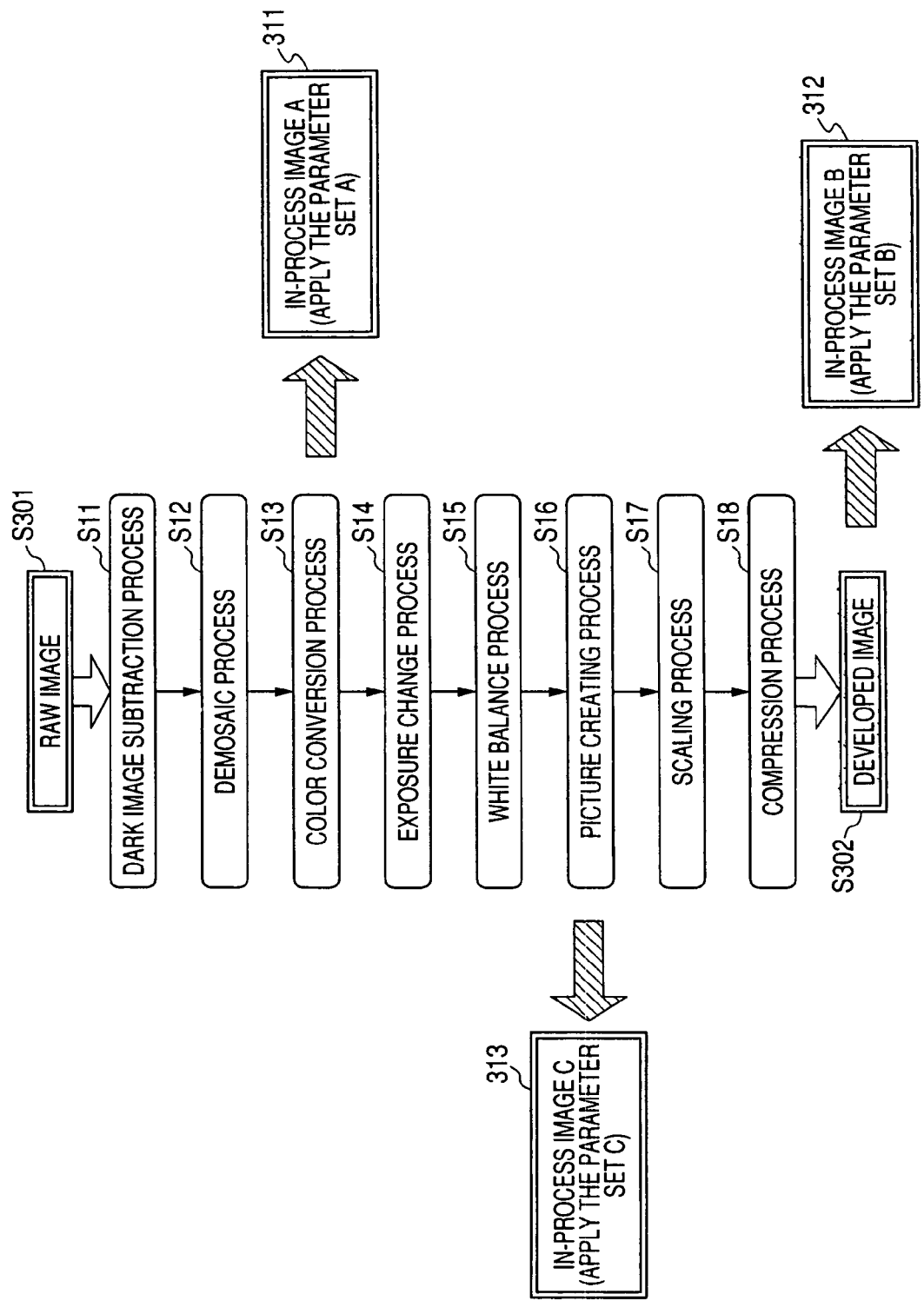
FIG. 5 shows a diagram illustrative of a specific example of a developed image to be stored in the RAW image file or an in-process image according to an embodiment of the invention.

In FIG. 5, in order to obtain a developed image 302 from a single item of RAW image data 301, processes of Steps S11 to S18 shown in FIG. 5, for example, are necessary. In addition, an exemplary development process shown in FIG. 5 depicts one example, and there are many development processes having other sequences and process configurations.

For example, the RAW image data 301 undergoes the processes below to crate a developed image 302.

Step S11: Dark image subtraction process.
Step S12: Demosaic process.
Step S13: Color conversion process.
Step S14: Exposure change process.
Step S15: White balance process.
Step S16: Picture creating process.
Step S17: Scaling process.
Step S18: Compression process.

When the processes of Steps S11 to S18 are executed, process parameters to determine each of the processing forms are set to execute the processes. For example, a parameter set B is a parameter set that is applied at each of Steps S11 to S18 in order to obtain a developed image B 312.

More specifically, the developed image B 312 is a developed image which is created by applying the parameter set B at Steps S11 to S18. For example, the parameter set B is stored as the development parameter set B 233 in the RAW image file format 200 shown in FIG. 3. Furthermore, data of the developed image B 312 which is created by applying the development parameter set B 233 is stored as the developed or in-process image B 231 in the RAW image file format 200 shown in FIG. 3.

An in-process image A 311 shown in FIG. 5 is not an image created by applying all the eight development process steps from Steps S11 to S18, which is an in-process image created by applying only three steps from the dark image subtraction process at Steps S11 to the color conversion process at Step S13, and which is uncompleted image data, not an image that development is finished.

A parameter set A is a parameter set that is applied at the process steps (S11 to S13) to create the in-process image A 311. For example, the parameter set A is stored as the development parameter set A 223 in the RAW image file format 200 shown in FIG. 3. Furthermore, data of the in-process image A 311 which is created by applying the development parameter set A 223 is stored as the developed or in-process image A 221 in the RAW image file format 200 shown in FIG. 3.

Furthermore, as similar to the in-process image A 311, an in-process image C 313 shown in FIG. 5 is not an image created by applying all the eight development process steps from Steps S11 to S18, which is an in-process image created by applying only six steps from the dark image subtraction process at Steps S11 to the picture creating process at Step S16, and which is uncompleted image data, not an image that development is finished.

A parameter set C is a parameter set that is applied at the process steps (S11 to S16) to create the in-process image C 313. For example, the parameter set C is stored as the development parameter set C 243 in the RAW image file format 200 shown in FIG. 3. Furthermore, data of the in-process image C 313 which is created by applying the development parameter set C 243 is stored as the developed or in-process image C 241 in the RAW image file format 200 shown in FIG. 3.

As described above, the RAW image file created in accordance with the RAW image file format 200 shown in FIG. 3 is configured to hold a plurality of developed images and a plurality of items of in-process image data and to add development parameter sets and support information which are applied to each of the developed images and the in-process images. In addition, the support information is information configured of the rotation of the image, a color space for use, the scaling of the image, the title, attributes, etc. In addition, a thumbnail image is added to the individual developed or in-process images.

In addition, when there is a problem of memory capacity, this configuration may be done in which the main body of the developed and in-process image data and the thumbnail image are omitted. As described above, in the RAW image format before, a single RAW image is added with only a single development parameter and support information. However, in the RAW image file format shown in FIG. 3 according to an embodiment of the invention, it is configured to have a plurality of development parameter sets and a plurality of items of support information. A user can select a parameter set and support information that are the closest to desired ones among a plurality of the development parameter sets and a plurality of items of the support information and select a developed image, or run a development process.

The RAW image file format 200 shown in FIG. 3 is set as the format of a data file that is stored in the memory of the digital camera. In addition, in the RAW image file created in accordance with the RAW image file format 200; a plurality of development parameter sets and a plurality of items of support information are stored. However, these are set and stored in such a way that a development process is executed in accordance with a different preset parameter set and support information in taking an image to acquire a new RAW image and data including the processed image and the applied parameter is set as a single data set. In addition, a delete process and an addition process may be done which adds a new development parameter set and new support information by a user input process. More specifically, the data area including the parameter set and the support information to be set in the RAW image file is set as a data area which allows write, delete, and update.

Next, the configuration will be described with reference to FIG. 6, in which the files to be stored in the digital camera as the imaging apparatus are set in such a way that the RAW image file in accordance with the RAW image file format 200 shown in FIG. 3 is a master file and each of the data sets stored in the master file is a sub-file.

Figure 6:
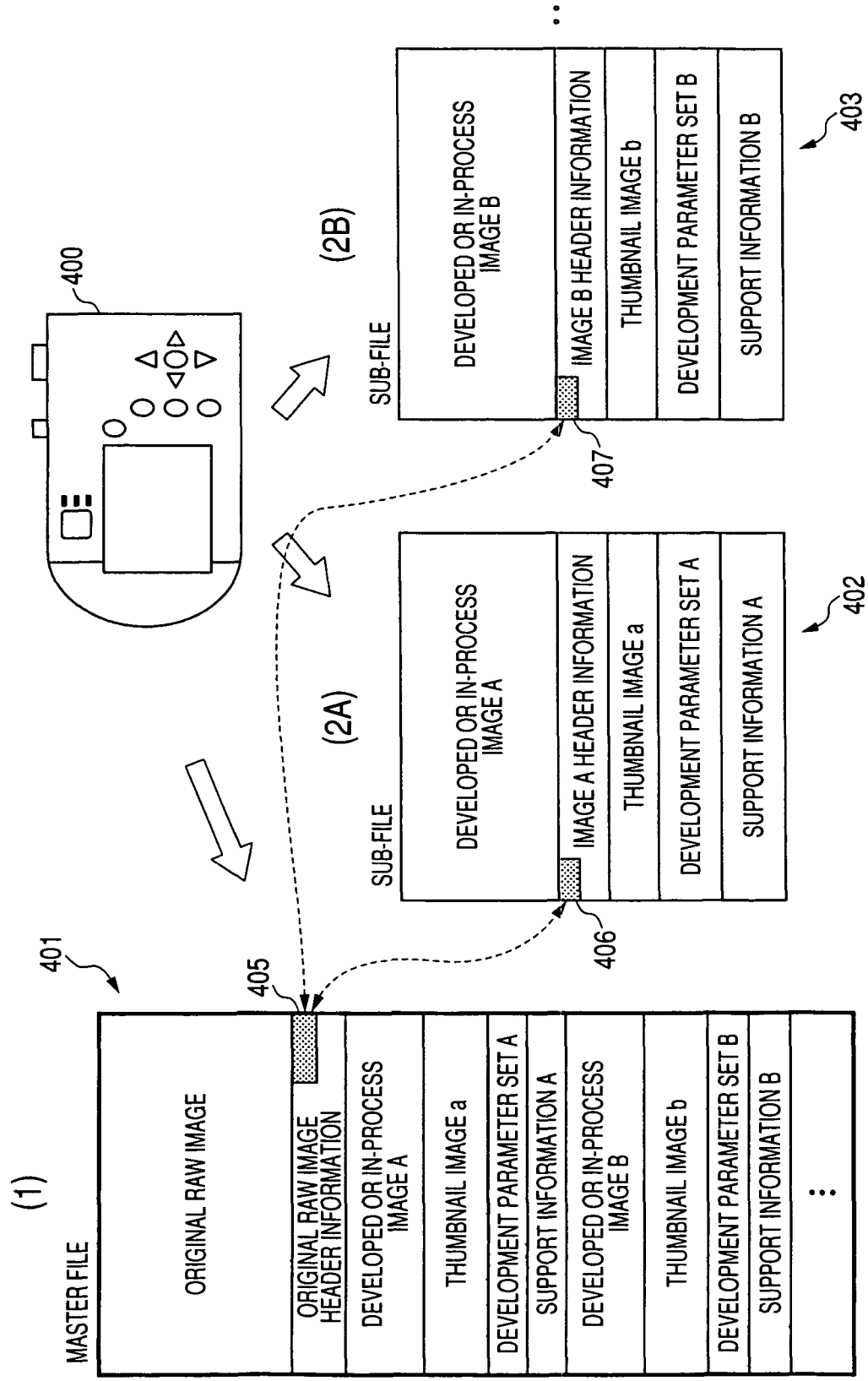
FIG. 6 shows diagrams illustrative of exemplary configurations of a master file and a sub-file which are created in the imaging apparatus according to an embodiment of the invention.

An imaging apparatus 400 shown in (1) in FIG. 6 creates a master file 401 which has the configuration shown in (1) in FIG. 6 and which is formed of RAW data based on a taken image and a plurality of the data sets A and so on, and stores it in the memory. The master file 401 is a RAW image file having the same configuration as that of the RAW image file format 200 described with reference to FIG. 3.

Furthermore, the imaging apparatus 400 separately creates sub-files 402, 403 and so on for the individual data sets A, B, C and so on included in the master file 401 in association with the creation of the master file 401 to be stored in the memory.

For example, the sub-file 402 shown in (2A) in FIG. 6 is a sub-file formed only of data corresponding to the data set A, and is configured of data included in the data set area A 220 in the RAW image file format 200 described with reference to FIG. 3. More specifically, this file is set as a file which has the following data to be stored.

a) A developed or in-process image A, which is formed of a developed image to which a specific parameter set A is applied, or an in-process image which is created by applying a specific parameter set A.
b) A thumbnail image a, which corresponds to the developed or in-process image A.
c) A development parameter set A, which is applied to create the developed or in-process image A.
d) Support information, which corresponds to the developed or in-process image A.
e) Image A header information, which is formed of attribute information corresponding to the developed or in-process image A, such as date and time when imaging and identification information including information "for calibration", "for Web positing", and "for work", for example.

In addition, in the image A header information, a tag 406 is stored which shows that the image is a reproduction image (slave image). The tag is set with identification information (master ID) of a master file including the stored data of the sub-file which is a master thereof or a master RAW image.

On the other hand, in the original RAW image header information of the master file for which a sub-file is created, a tag 405 is stored which shows that the file is a file holding a master RAW image (a file holding a master image), and a master ID is held in the tag. In addition, identification information about a sub-file created based on master file storage data may be stored.

In addition, the sub-file 403 shown in (2B) in FIG. 6 is a sub-file formed only of data corresponding to the data set B, and is configured of data included in the data set area B 230 in the RAW image file format 200 described with reference to FIG. 3. More specifically, this file is set as a file which has the following data to be stored.

a) A developed or in-process image B, which is formed of a developed image to which a specific parameter set B is applied, or an in-process image which is created by applying the specific parameter set B.
b) A thumbnail image b, which corresponds to the developed or in-process image B.
c) A development parameter set B, which is applied to create the developed or in-process image B.
d) Support information, which corresponds to the developed or in-process image B.
e) Image B header information, which is formed of attribute information corresponding to the developed or in-process image B, such as date and time when imaging and identification information including information "for calibration", "for Web positing", and "for work", for example.

In addition, in the image B header information, a tag 407 is stored which shows that the image is a reproduction image (slave image). The tag is set with identification information (master ID) of a master file including the stored data of the sub-file which is a master thereof or a master RAW image.

Although not shown in the drawing, the other data sets C and so on included in the master file 401 having the configuration shown in (1) in FIG. 6 are also created to have the separate sub-files to be stored in the memory.

As shown in sub-files 402 and 403 in (2A) and (2B) in FIG. 6, to the sub-file which is stored in the memory of the digital camera 400 and can be outputted to outside, developed or in-process image data, a development parameter set and support information used to create an image, a thumbnail and so on are added. In addition, as described above, this scheme may be done in which depending on the permissive capacity of the memory, image data and a thumbnail are omitted to set a sub-file that stores only header information, a development parameter set and support information.

As described above, a single master file is set as the file in which a single RAW image is taken and stored in the memory, sub-files are set as the file formed of various parameter sets and image data processed by the parameter sets, and the master file and the sub-files are stored in the memory. Thus, developed images or in-process images for various purposes can be obtained separately at the same time. For example, the imaging apparatus is registered or initially set with development parameter sets and support information having different properties such as the purposes "for calibration", "for Web posting" and "for work". When an image is newly taken, a RAW image as well as developed or in-process images matched with the purposes are acquired quickly by applying a plurality of different parameter sets for processing, and the images are stored in a master file as well as sub-files are separately created and stored in the memory.

With the execution of the process like this, later development is unnecessary. Alternatively, the in-process image is applied to reduce the need for processing. More specifically, since developments are done beforehand depending on purposes, the load can be reduced greatly.

As described above, the in-process image is image data that is incompletely developed. Such an image that the development process steps are discontinued in the midway is created and held to allow performing only necessary process steps in concentration. A user can concentrate attention only on adjusting necessary processes, and can shorten a development time period.

As described above, the master file which stores a RAW image has a tag therein showing that it is the master file having master RAW image data therein, and the tag has a master ID therein. The RAW image for separate purposes, the developed image, or the in-process image outputted at the same time with the master RAW image stores a tag showing that the image is a reproduction image (a slave image) therein, and the tag has the master ID of its master RAW image therein.

Therefore, it can be determined with which master RAW image the image is outputted at the same time. When the process is not able to perform sufficiently with the use only of the developed image or the in-process image, the tag and identification information are applied, and thus the RAW original image or the master file having the RAW original image therein is acquired for use in processing.

Figures 2, 7:
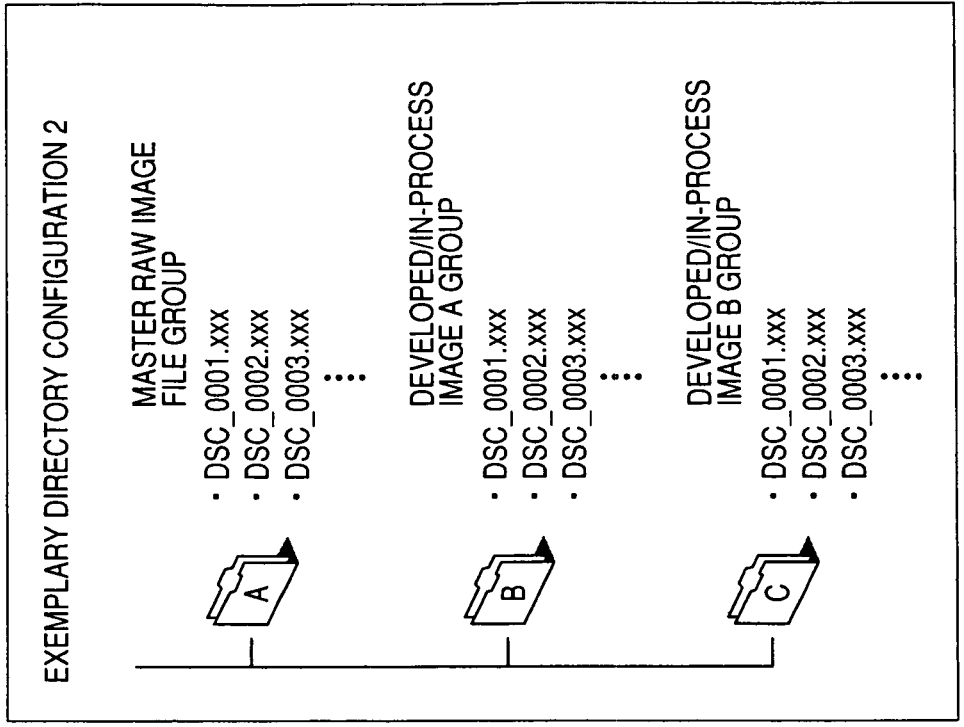
Figures 1, 7:
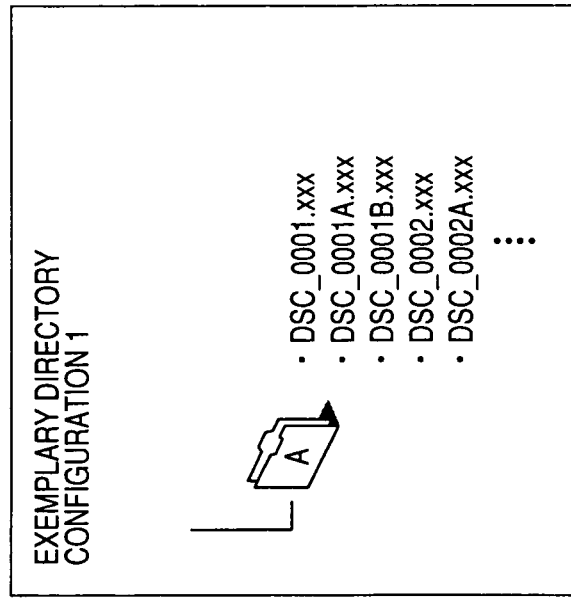

Exemplary directory configurations of the data files to be stored in the memory of the imaging apparatus 400 will be described with reference to FIGS. 7-1 and 7-2. The files shown in FIGS. 7-1 and 7-2 are the files below.

[DSC_0001.xxx] is a master file corresponding to RAW data 0001.

[DSC_0001A.xxx] is a sub-file including an image A to which the parameter A corresponding to RAW data 0001 is applied.

[DSC0001B.xxx] is a sub-file including an image B to which the parameter B corresponding to RAW data 0001 is applied.

[DSC0001C.xxx] is a sub-file including an image C to which the parameter C corresponding to RAW data 0001 is applied.

[DSC0002.xxx] is a master file corresponding to RAW data 0002.

[DSC0003.xxx] is a master file corresponding to RAW data 0003.

These master files are set with the sub-files A, B, C and so on individually.

The master file which stores a master RAW image and the sub-files which include data contained in the master file are stored in the same directory, for example, and are stored with very close names as the file names with one character different such as adding or varying one character. Alternatively, when they are stored in different directories, the master file and the sub-files are stored for settings of the same names (the same file names). Thus, a user can easily distinguish between the master file as the parent file and the sub-file as the slave file.

FIGS. 7-1 and 7-2 show two exemplary directory configurations. FIG. 7-1 shows the configuration in which the master file and the sub-file corresponding to a single item of RAW image data are stored in a single directory, and FIG. 7-2 shows the directory configuration in which a master file and the individual sub-files are categorized into each parameter such as a directory for setting only a master file, a directory for storing a sub-file formed only of an image A group to which the parameter A is applied, and a directory for storing a sub-file formed only of an image B group to which the parameter B is applied.

The file storage configuration in this directory configuration is provided to allow a user to select and acquire the master file 401 shown in (1) in FIG. 6, and to select and output the sub-file 402 shown in (2A) in FIG. 6, or the sub-file 403 shown in (2B) in FIG. 6 when data is outputted to a PC for image processing (the development process), for example.

The user can acquire a desired image file from various data files for processing as desired. An example of image processing that uses these sub-files will be described with reference to FIG. 8.

Figure 8:
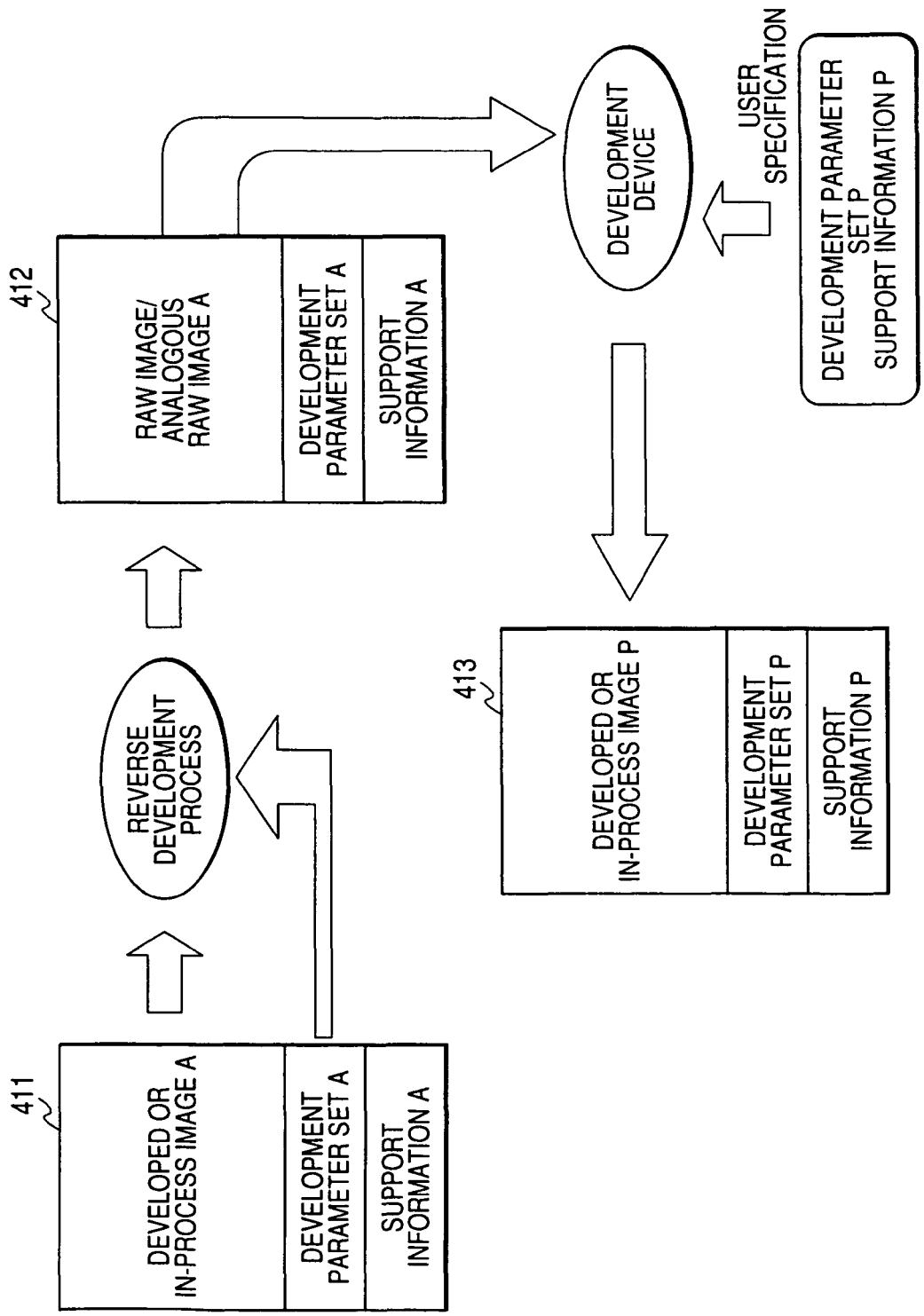
FIG. 8 shows a diagram illustrative of an exemplary use of an image data file which is created in the imaging apparatus according to an embodiment of the invention.

FIG. 8 shows an exemplary process which uses a single sub-file 411 for processing. The sub-file stores the developed or in-process image A that is created by applying the development parameter set A, the development parameter set A and support information A therein.

For example, the image processing apparatus such as a PC which executes the image processing program acquires a developed or in-process image A from the sub-file 411, further acquires the development parameter set A to execute a reverse development process to which the development parameter set A is applied, and thus acquires RAW data that is original data of the developed or in-process image A.

For example, when the developed or in-process image A stored in the sub-file 411 is an image corresponding to the in-process image A 311 which is described with reference to FIG. 5, the development parameter set A included in the sub-file 411 stores the parameters applied to the following process steps shown in FIG. 5.

Step S11: Dark image subtraction process.
Step S12: Demosaic process.
Step S13: Color conversion process.

These parameters are applied to execute an inversion process in accordance with the reverse procedures of the processes from Steps S11 to S13, and thus the original RAW image data can be acquired. In addition, when the process steps have an irreversible process, an analogous RAW image is created.

A sub-file 412 can be created which includes a RAW image or an analogous RAW image created by the reverse development process like this. Furthermore, with respect to the RAW image or the analogous RAW image stored in the sub-file 412, a user performs the development process to which a new parameter set P and support information P set by the user are applied to create a new developed or in-process image P, and a new sub-file 413 can be created which stores the new developed or in-process image P and the applied parameter P and the support information P therein.

As described above, the image, the parameter and the other data stored in the sub-file are applied to acquire RAW data created by the reverse development process. In addition, the development process in which the new parameter set is applied to the acquired RAW data can create new image data. Even though a user who does not have a RAW image, he/she can create the RAW image, and the user can use another development parameter set created by the user for development again. Therefore, the number of creatable images is dramatically increased such that opportunities for fine tuning matched with the user's tastes, and the degree of freedom to edit images is grown.

Exemplary settings of the sub-file shown in FIG. 6 are the exemplary sub-file configurations which store the sub-file containing a specific development parameter set and support information, and image data created by the development parameter set and the support information. However, for example, as shown in FIG. 9, sub-file configurations may be formed in which a specific development parameter set and support information and RAW image data are combined.

Figure 9:
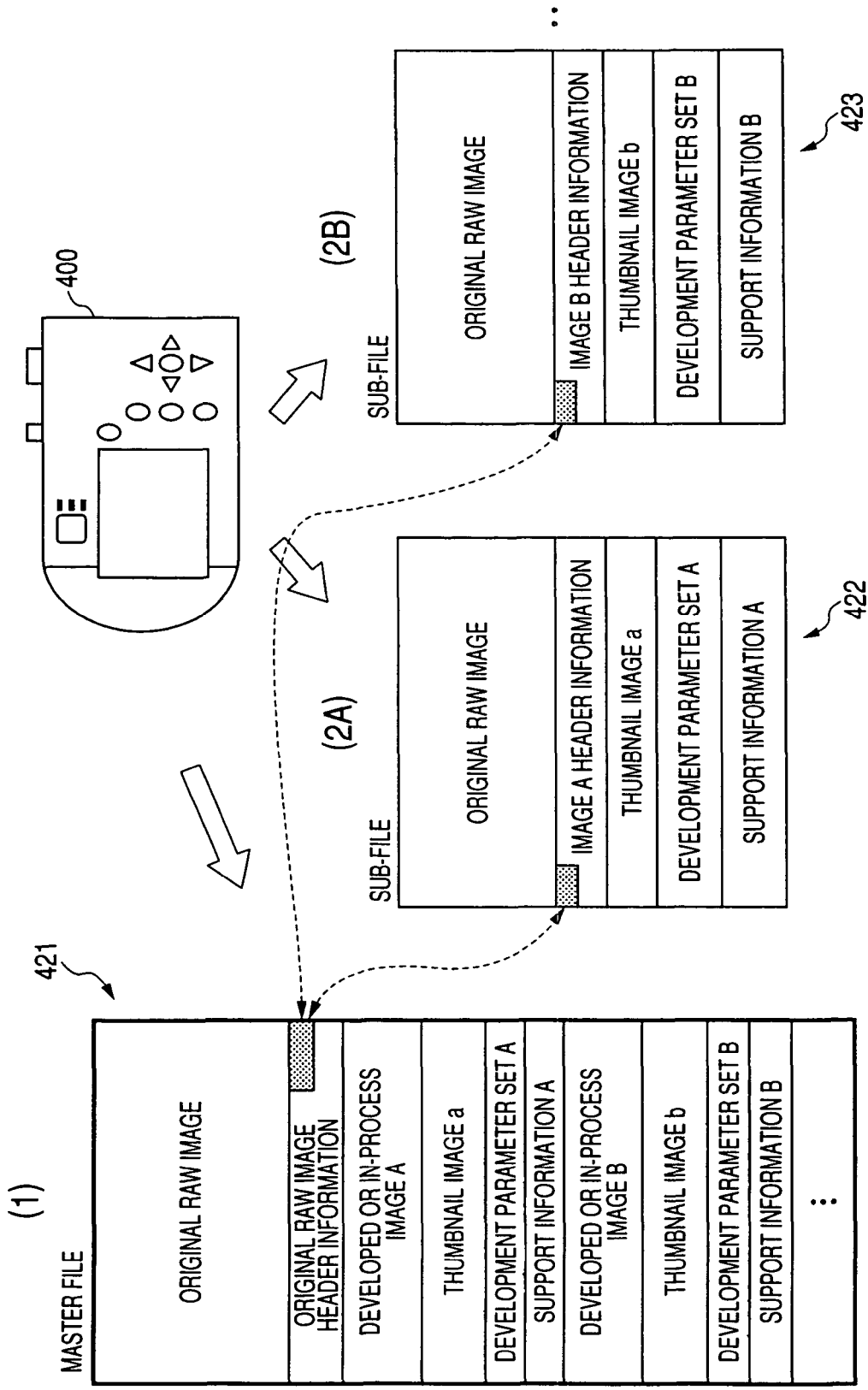
FIG. 9 shows diagrams illustrative of exemplary configurations of a master file and a sub-file which are created in the imaging apparatus according to an embodiment of the invention.

FIG. 9 shows a master file 421 which has the same data configuration as that of (1) in FIG. 6, and sub-files 422 and 423 which combine the specific development parameter sets and support information and RAW image data corresponding to data sets A and B included in the master file 421. The individual items of header information are data including tags and IDs to determine the correspondence between the master file and the sub-files.

As described above, the imaging apparatus 400 can create the master RAW image file and the sub-files including the specific development parameter set and support information, and store the sub-file in the memory as well as it can output the sub-files to outside separately. The sub-files can be used for files for separate purposes "for calibration", "for Web posting", "for work" and so on.

The sub-files are set and managed separately from the RAW data file, and thus a RAW image to which only a suitable development parameter set and support information are added depending on a recipient, when a taken RAW image is sold or given to another person, for example. For example, when a photographer takes a RAW image, he/she gives it as a development parameter set is varied depending on a client. Thus, the client can use it with no confusion, and can adjust development as desired because it is a RAW image. The photographer keeps all information in the master RAW image that he/she has as well as he/she can prevent an undesired drain of know-how. In addition, it leads to a reduction in the capacity of a file to give.

Next, the thumbnails to be stored in the RAW image file described with reference to FIG. 3 and the master file and the sub-file described with reference to FIGS. 6 and 9 will be described. As described above, for example, the RAW image file described with reference to FIG. 3 has a plurality of development parameter sets and a plurality of items of support information as well as the thumbnail corresponding to the developed image or the in-process image which is created by using the development parameter set.

For example, a user performs the development process by applying a development application in a PC, the user can display thumbnails corresponding to a developed image to which the different parameter set is applied (or the in-process image) included in the RAW image file described with reference to FIG. 3, and the user can compare thumbnails and select a parameter set that is to be applied to the development process executed based on a thumbnail image matched with the user's tastes.

Figure 10:
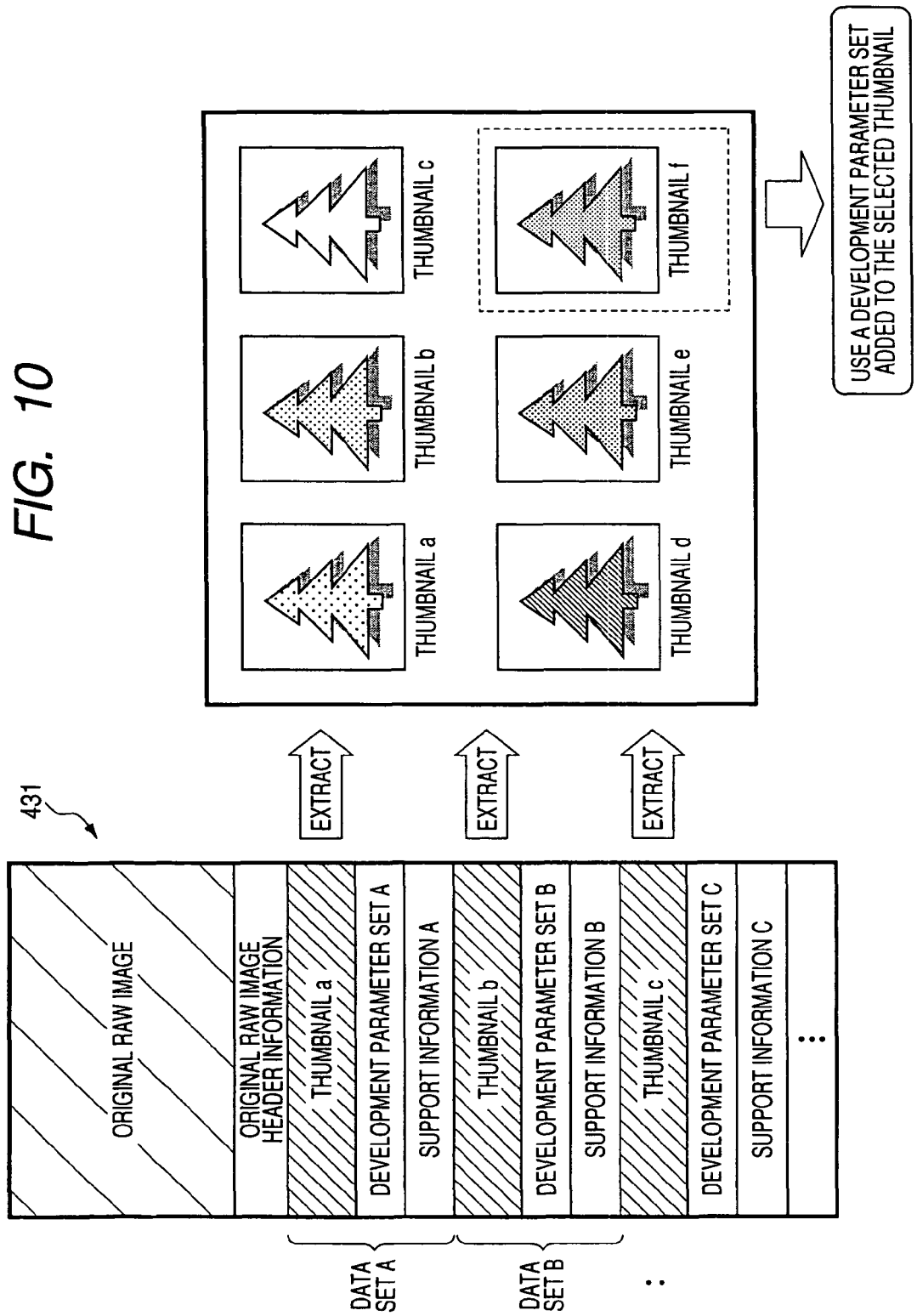
FIG. 10 shows a diagram illustrative of an exemplary use of a thumbnail included in the RAW image file which is created in the imaging apparatus according to an embodiment of the invention.

For example, as shown in FIG. 10, on the display of a user PC, thumbnails are displayed which correspond to the developed images to which the different parameter sets are applied (or the in-process image) included in the RAW image file 431 which stores a plurality of data sets including the thumbnails corresponding to a plurality of different parameter sets.

FIG. 10 shows exemplary thumbnails a to f, which correspond to six developed images A to F (or the in-process images) to which different parameter sets included in the RAW image file 431 are applied. A user can compare the set thumbnails to select the parameter set which is applied to the development process based on the thumbnail image matched with the user's tastes.

In addition, furthermore, in addition to the thumbnails, this configuration may be done in which support information corresponding to each of the data sets A to F is displayed, such as support information about the rotation of the image, the color space for use, the scaling of the image, the resolution, the title and attributes. The user uses the listed thumbnails and support information about resolution and color space information as materials for determination to visually select the development parameter to be applied to the original RAW image. Based on the development parameter set and the support information thus selected, the user can perform the development process for an objective image, or can perform development added with adjustment by adapting the in-process image included in the RAW image file 431.

In addition, even though the thumbnail image is omitted and not stored in the RAW image file, a development application on the PC side is adapted to apply each of the development parameter sets included in the RAW image file with respect to the original RAW image included in the RAW image file, and a preview image is created on the spot. Thus, the image data or the thumbnail image corresponding to each of the parameters can be represented.

Figure 11:
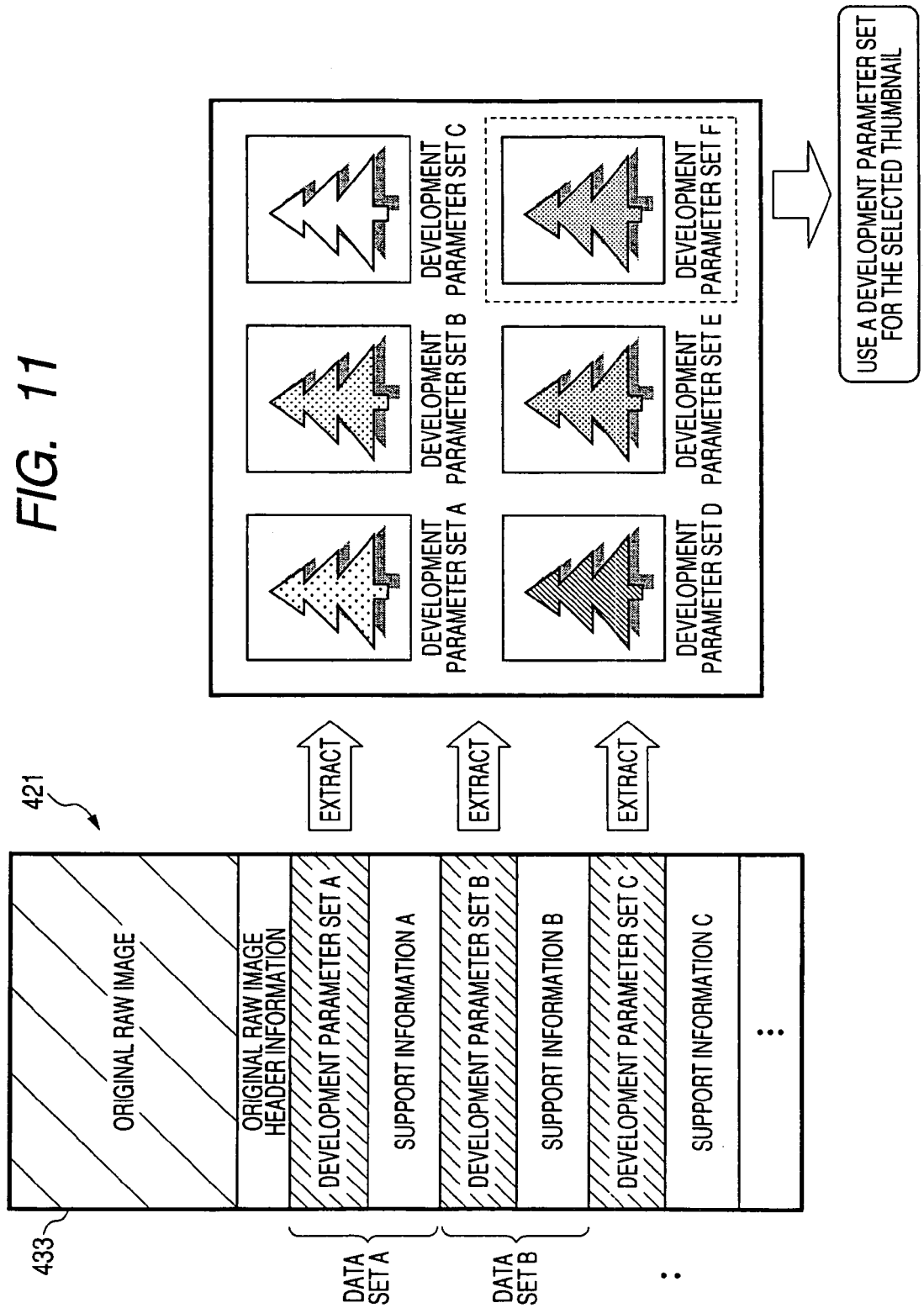
FIG. 11 shows a diagram illustrative of an exemplary use of a thumbnail included in the RAW image file which is created in the imaging apparatus according to an embodiment of the invention.

For example, as shown in FIG. 11, when a thumbnail image is omitted and not stored in a RAW image file 432, a development application on the PC side is adapted, an original RAW image 433 included in the RAW image file 432 is extracted, the development parameter sets corresponding to data sets A, B and so on included in the RAW image file 432 are applied to the original RAW image 433. Thus, preview thumbnail images can be represented.

For example, the RAW image file 432 stores development parameter sets and support information and thumbnail images corresponding to the imaging modes such as a person mode, a landscape mode and a nightscape mode. Thus, a user can use a RAW development device to select an imaging mode for creating a desired image without setting the imaging mode beforehand.

In addition, the process described above can be executed in the information processing unit such as a PC as well as it may be configured to be executed in an imaging apparatus main body which takes image data. For example, the thumbnail image resulted from the process is outputted to the monitor screen of the imaging apparatus. For example, JPEG image data is created and outputted based on RAW data on the camera that takes an image. As described above, the parameter set can be selected to be applied to the development process in the imaging apparatus. Thus, after the RAW image is taken, a user can obtain an image to which a desired development process is applied in the imaging apparatus.

As described above, according to the configuration of an embodiment of the invention, RAW image data and a plurality of different parameter sets are stored in the RAW image file format, a user can acquire a RAW image at a given point in time to execute a process to which a given parameter set is applied, and can create images for separate purposes to which a plurality of different parameters is applied based on a single item of RAW image. Since it is unnecessary for the user to newly set a parameter set and those stored in the RAW image file format can be applicable. Thus, the user's effort for processing is reduced.

For example, when a camera person supplies image data to a plurality of clients, the tendency of an image desired by a client is sometimes varied depending on clients. The development parameter set and support information corresponding to various images are registered in a camera beforehand. Thus, all the registered images can be held as thumbnails at a single shoot, and the parameter is only selected in development based on the RAW image to easily create various different images.

In addition, in executing the development process, the process is performed which adapts the in-process image stored in the RAW image file format. In this case, even though fine tuning is desired, adjustment is done from the preset development parameter set, and thus the adjusted amount is small to reduce the effort. When there is allowance in the capacity, with regard to the development parameter set and support information frequently used, the developed image is outputted at the same time to eliminate the later RAW development process. In addition, for example, even though a client desires to supply an RAW image, the camera person can keeps a master RAW image at hand, and can give the RAW image added with the development parameter set and support information for that client which is outputted at the same time when imaging.

In addition, when a developed or in-process image is supplied to a client as a final product, the client sometimes desires to add fine tuning to the supplied image. As described above, in the master file and the sub-files corresponding to the RAW image file format, the developed or in-process image is stored to which the development parameter set and support information are added. As described with reference to FIG. 8, the reverse development process and the development process are executed on the client side to allow development again.

Thus, sufficient adjustment can be done on the client side without returning the image to the camera person all the time. It can be a significantly effective scheme when adjustment is not frequently done at the degree to supply a RAW image. The reverse development is once done to do fine tuning of higher quality than primitive image processing.

In addition, the camera has the development parameter sets and support information for a person, landscape, flowers, nightscape, blue skies and so on beforehand, and RAW data is added with all or a part of the development parameter sets and support information and thumbnails when imaging. Thus, it is unnecessary for a user to change the imaging mode, and the user can later select the mode from all the modes. Therefore, it is unnecessary for the user to set the imaging mode beforehand, he/she can concentrate on imaging, and select a preferred image from the listed thumbnails for the development process to which the parameter corresponding to the selected image is applied with no adjustment settings later.

In addition, as described above, the parameter set which is applied to the development process can be selected in the imaging apparatus. Thus, after a RAW image is taken, a user can obtain an image to which the desired development process is applied in the imaging apparatus.

In addition, an exemplary configuration is described in which in the RAW image file described in accordance with the RAW image file format (FIG. 3) and the master file and the sub-files described with reference to FIGS. 6 and 9 in the embodiment above, the parameter set applied to create the developed image or the in-process image included in a data set is contained in the data set including the developed image or the in-process image. However, this configuration may be done in which a parameter set corresponding to a process sequence different from the parameter set applied to create the developed image or the in-process image included in the RAW image file (FIG. 3) and the master file and the sub-files described with reference to FIGS. 6 and 9.

Figure 12:
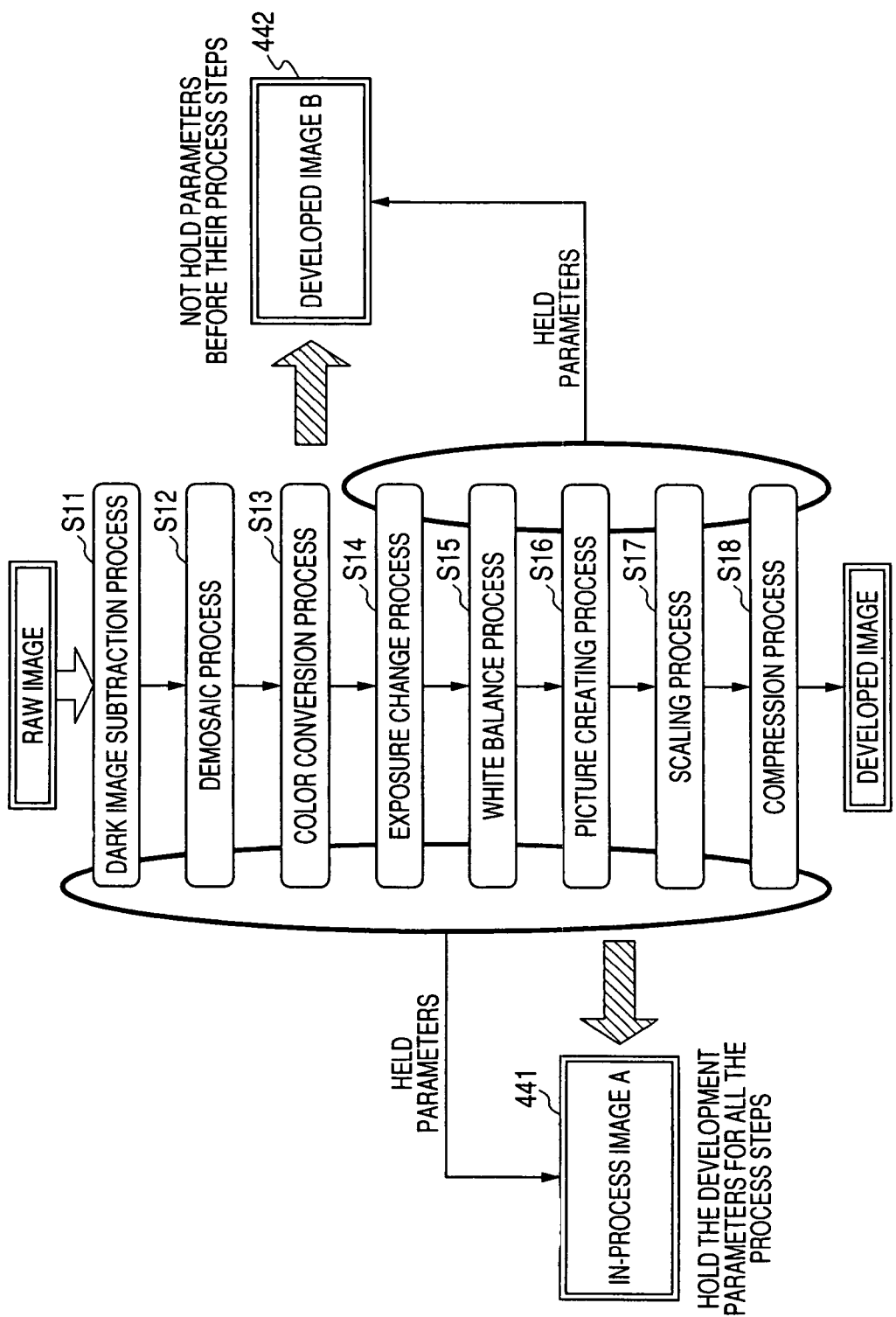
FIG. 12 shows a diagram illustrative of specific examples of a developed image to be stored in the RAW image file or an in-process image and a parameter set according to an embodiment of the invention.

An exemplary storage of the parameter set will be described with reference to FIG. 12. As similar to the description with reference to FIG. 5, FIG. 12 shows a diagram depicting the process Steps S11 to S18 to create a developed image from a RAW image.

An in-process image A 441 and an in-process image B 442 shown in the drawing show an in-process image included in the RAW image file (FIG. 3) and the master file and the sub-files described with reference to FIGS. 6 and 9. For example, the in-process image A 441 is an in-process image created by executing the dark image subtraction process at Steps S11 to the picture creating process at Step S16, and the in-process image B 442 is an in-process image created by executing the dark image subtraction process at Steps S11 to the color conversion process at Step S13.

Here, for the parameter set to be included in the data set corresponding to the in-process image A 441, all the parameter sets from Steps S11 to S18 are included. Here, the parameters from Steps S11 to S16 are the parameters actually applied in creating the in-process image A 441, and the parameters from S17 to S18 store the optimum parameters suitable for processing.

In addition, for the parameter set to be included in the data set corresponding to the in-process image B 442 created by executing the dark image subtraction process at Steps S11 to the color conversion process at Step S13, the parameter sets from Step S14 to S18 are included. The parameters store the optimum parameters suitable for the processes from Steps S14 to S18 executed with respect to the in-process image B 442.

For example, for the parameter set to be included in the data set corresponding to the in-process image A 441, all the parameter sets from Steps S11 to S18 are included. Thus, a user can acquire the in-process image A 441, and apply the parameters at S17 to S18 included in the data set to execute the process for creating a final developed image. Therefore the user can omit the parameter setting process done by the user. In addition, the parameters corresponding to Steps S11 to S16 may be applied to execute the reverse development process for obtaining the RAW image or the analogous RAW image.

In addition, for the parameter set to be included in the data set corresponding to the in-process image B 442, the parameter sets at Step S14 to S18 are included. Thus, a user can acquire the in-process image B 512, and apply the parameters at Step S14 to S18 to execute the process for creating a final developed image. Therefore the user can omit the parameter setting process done by the user. In addition, since the data set corresponding to the in-process image B 442 does not include the parameters corresponding to Steps S11 to S13, the RAW image or the analogues RAW image is not able to attain by executing the reverse development process. When the RAW image is not desired to open, the parameter setting like this is effective.

Figure 13:
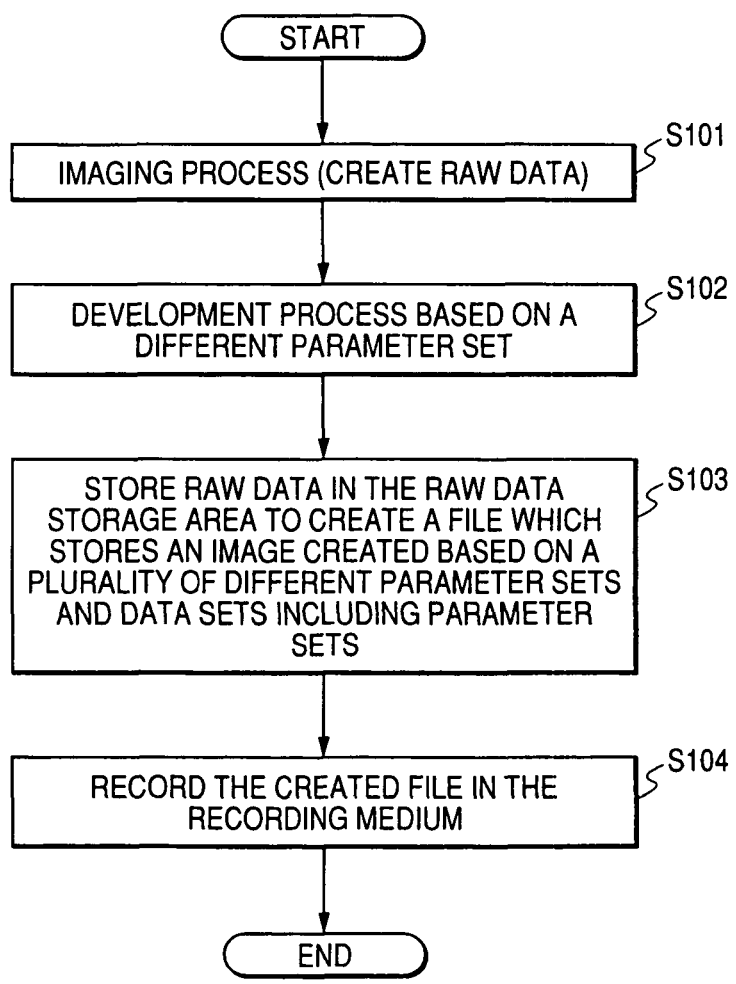
FIG. 13 shows a diagram depicting a flow chart illustrative of a process sequence of the imaging apparatus implementing a process which creates and stores the image file.
Figure 14:
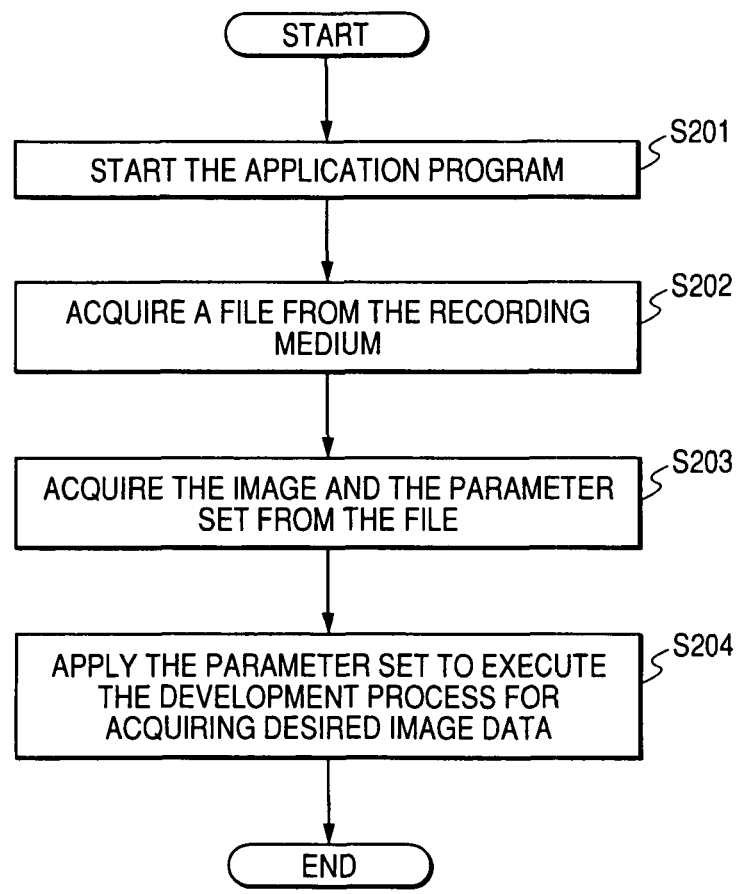
FIG. 14 shows a diagram depicting a flow chart illustrative of a process sequence of the image processing apparatus implementing signal processing which reads data out of the image file.

Next, individual process sequences will be described with reference to flow charts shown in FIGS. 13 and 14, which are a storage process of the RAW data and the parameter set executed in the imaging apparatus according to an embodiment of the invention, and a process to read the RAW data and the parameter set for signal processing in the image processing apparatus.

First, the process sequence of the storage process of the RAW data and the parameter set executed in the imaging apparatus according to an embodiment of the invention will be described with reference to a flow chart shown in FIG. 13.

The imaging apparatus executes an imaging process at Step S101. Based on subject image taken by the imaging device (CCD), RAW data is created as a digital signal.

At Step S102, a development process is executed with respect to the taken RAW data based on a different parameter set. More specifically, a developed image or an in-process image is created.

At Step S103, data is stored in accordance with the file format described with reference to FIG. 3, that is, in accordance with the RAW image data file format formed of the file format having the RAW data storage area and the storage area for a plurality of data sets including a plurality of different developed images or in-process images and parameter sets. In addition, when the sub-file creation configuration is provided, the sub-file described with reference to FIGS. 6 and 9 is created for storage.

At Step S104, a file is stored in the recording medium such as a flash memory, the file is in accordance with the RAW image data file format formed of the file format having the storage areas for a plurality of data sets including RAW data and a plurality of different developed images or in-process images and parameter sets, and also the sub-file when it is created. For example, for the data storage directory, the directory configuration described with reference to FIG. 7 is adapted.

Next, the process sequence of the process to read the RAW data and the parameter stored in the recording medium with reference to FIG. 14 for signal processing based on the read data in the image processing apparatus such as a PC will be described with reference to a flow chart shown in FIG. 14.

First, at Step S201, a signal processing program installed in the image processing apparatus such as a PC is started, and at Step S202, a file is selected which stores the target image data for processing from the recording medium. For example, it is the file in accordance with the RAW image file format 200 shown in FIG. 3, or the sub-file described with reference to FIGS. 6 and 9.

At Step S203, a developed image or an in-process image included in the file is acquired, and the corresponding parameter set is further acquired. Subsequently, the process goes to Step S204, and the process is executed based on the acquired image or the in-process image and the parameter set. The process is executed as the process including the development process and the reverse development process described with reference to FIG. 8.

As described above, in the configuration of an embodiment of the invention, it is configured to store a plurality of different parameter sets. Thus, these parameter sets are freely selected to execute the development process to create various items of image data.

Next, an exemplary hardware configuration of the imaging apparatus and the image processing apparatus according to an embodiment of the invention will be described with reference to FIGS. 15 and 16.

First, an exemplary hardware configuration of the imaging apparatus such as a digital camera will be described with reference to FIG. 15. As shown in FIG. 15, the imaging apparatus has a lens 451, a solid state imaging device (CCD) 452, an analog signal processing part 453, an A/D converting part 454, a digital signal processing part 455, a code 456, a memory 457, a D/A converting part 458, an encoder 459, a monitor 460, a CPU 471, an input part 472, and a storage part 473.

The input part 472 includes manipulation buttons such as a shutter button in a camera main body. In addition, the digital signal processing part 455 is a block having a signal processing processor and an image RAM, in which the signal processing processor performs image processing programmed beforehand with respect to image data stored in the image RAM.

The incident light passes through the optical system to reach the solid state imaging device (CCD) 452, and reaches each of the light receiving devices on the imaging surface. It undergoes photoelectric conversion by the light receiving devices and is converted to electric signals. The noise of the signals is filtered by the analog signal processing part 453, and the signals are converted to digital signals by the A/D converting part 454. Then, digital signal processing is done in the digital signal processing part (DSP) 455. The format processing part corresponds to a part of the configuration of the digital signal processing part 455, the format processing part which executes a creation process of the image data file having therein the RAW data in accordance with the file format and the parameter which is applied to signal processing for the RAW data described above. The digital signal processing part 455 creates a developed image or an in-process image by processing RAW data with various parameters, creates the image data file which stores the RAW data and each of the data sets in the file in accordance with the RAW image file format described with reference to FIG. 3, executes a compression and encoding process in the code 456, and records data in the memory 457 which is a storage medium such as a memory card.

In addition, the image data created at the digital signal processing part is also inputted to the D/A converting part 458. The image data is converted to analog signals, they are converted to video signals by the encoder 459, and the video signals are monitored by a monitor 460. The video monitor 460 is used as the monitor screen of the camera. In addition, the overall data processing control is done by the CPU 471 which functions as the control part in accordance with a program stored in the storage part 473.

Next, an exemplary hardware configuration of the image processing apparatus which executes image processing will be described with reference to FIG. 16. A CPU (Central Processing Unit) 501 functions as an image processing part which executes the process corresponding to an OS (Operating System), the signal process in which the parameter is applied to RAW data described in the embodiment, and the process to select the parameter from the image data file stored in the recording medium. These processes are executed in accordance with a computer program stored in the data storage part such as a ROM and a hard disk drive of the image processing apparatus.

A ROM (Read Only Memory) 502 stores programs and computing parameters used by the CPU 501. A RAM (Random Access Memory) 503 stores the programs for use in executing the CPU 501 and parameters properly changed in the execution. These are connected to each other with a host bus 504 configured of a CPU bus or the like.

The host bus 504 is connected to an external bus 506 such as a PCI (Peripheral Component Interconnect/Interface) bus through a bridge 505.

A keyboard 508 and a pointing device 509 are input devices operated by a user. A display 510 is formed of a liquid crystal display device or a CRT (Cathode Ray Tube), which displays various items of information in text and images.

A HDD (Hard Disk Drive) 511 has a hard disk drive incorporated therein, which drives the hard disk drive to record or play programs and information executed by the CPU 501. For example, the hard disk drive is used as the storage area for the image data file as well as it stores various computer programs such as a data processing program.

A drive 512 reads data or a program stored in a mounted removable recording medium 521 such as a magnetic disk, an optical disc, a magneto-optical disk, or a semiconductor memory, and supplies the data or the program to the RAM 503 connected through an interface 507, the external bus 506, the bridge 505, and the host bus 504. The removable recording medium 521 is also used as a recording medium in which the image data file including the RAW data and the parameters described above are stored.

A connecting port 514 is a port which connects an external connecting device 522, which has a connecting part such as USB and IEEE 1394 devices. The connecting port 514 is connected to the CPU 501 and the other devices through the interface 507, the external bus 506, the bridge 505, the host bus 504, etc. A communication part 515 is connected to a network, which communicates with other information processing units.

Figure 15:
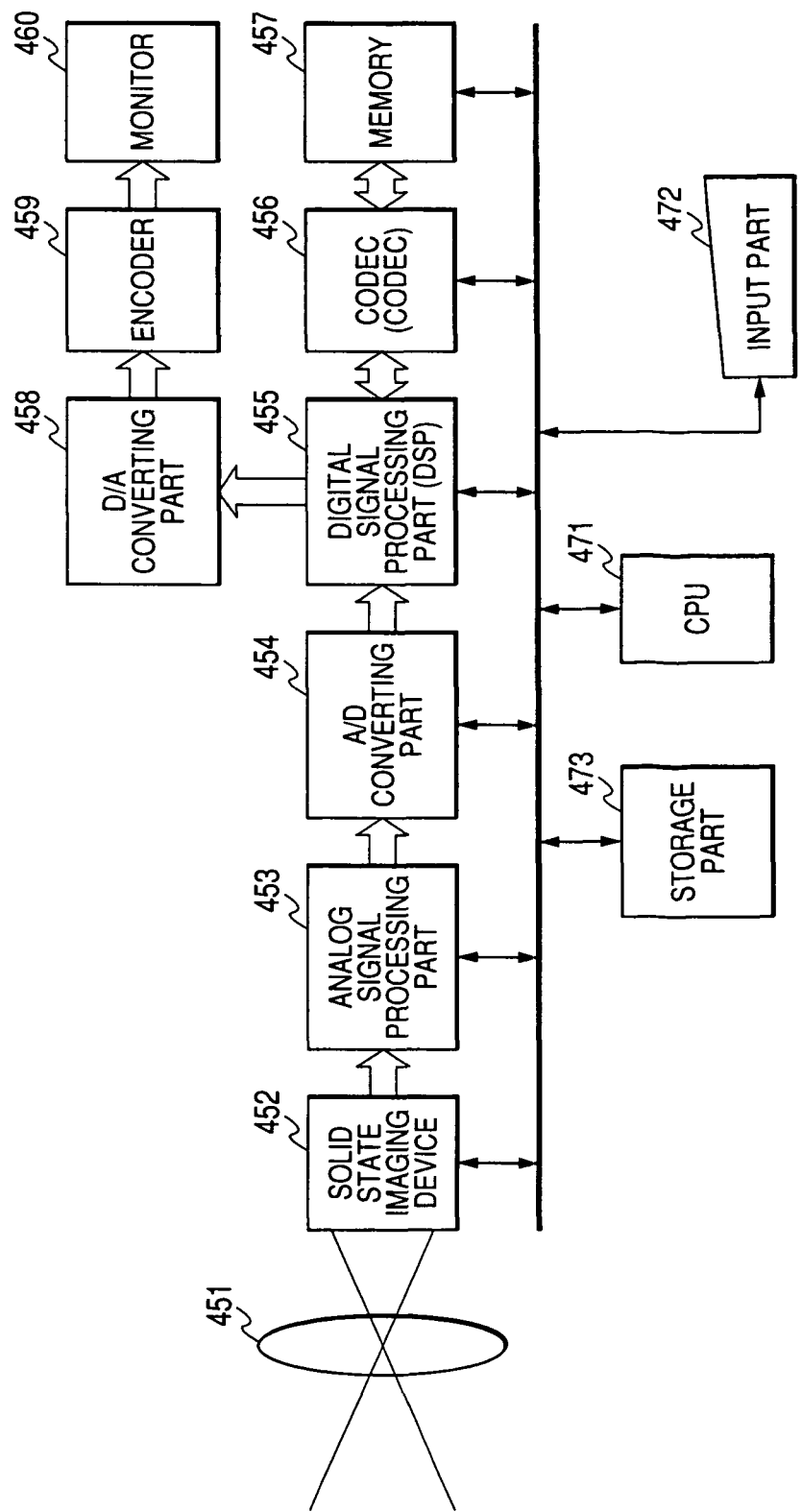
FIG. 15 shows a diagram depicting an exemplary hardware configuration of the imaging apparatus according to an embodiment of the invention.

In addition, exemplary hardware configurations of the imaging apparatus and the image processing apparatus shown in FIGS. 15 and 16 are apparatus examples, and the imaging apparatus and the image processing apparatus are not limited to the configurations shown in FIGS. 15 and 16. The configuration may be fine which can execute the processes described in the embodiment.

As described above, an embodiment of the invention has been described in detail with reference to the specific embodiments. However, it is apparent that a person skilled in the art can make modifications and substitutions of the embodiment with in the scope not deviating from the teaching of the invention. More specifically, the invention is disclosed in the exemplary forms and should not be understood in limited ways. In order to consider the teachings of the invention, it should be consider the appended claims.

In addition, a series of the processes described in the specification can be implemented by hardware, or software, or the combined configuration thereof. When the processes are implemented by software, a program recorded with the process sequence can be installed in a memory in a computer incorporated in dedicated hardware for implementation, or a program can be installed in a general purpose computer which can execute various processes for implementation.

For example, the program can be recorded beforehand in a hard disk drive and a ROM (Read Only Memory) as the recording medium. Alternatively, the program can be stored (recorded) temporarily or permanently in a removable recording medium such as a flexible disc, CD-ROM (Compact Disc Read Only Memory), MO (Magneto-optical) disc, DVD (Digital Versatile Disc), a magnetic disk and a semiconductor memory. The removable recording medium like this can be offered as so-called package software.

Moreover, in addition to the installation of the program from the removable recording medium to the computer as described above, the program can be installed in such ways that it is transferred from a download site to a computer in a wireless manner, and that it is transferred to a computer through a network such as a LAN (Local Area Network) and the Internet in a cabled manner, the computer receives the program thus transferred and installs it in a recording medium such as a hard disk drive incorporated therein.

In addition, various processes described in the specification may be executed in a time series in accordance with the description as well as they may be implemented in parallel or separately depending on the process performance of an apparatus to execute the processes or as desired. In addition, in the specification, a system is the configuration of a logical set of a plurality of devices, which is not limited to one that devices of individual configurations are in the same housing.

As described above, according to the configuration of an embodiment of the invention, this configuration is done in which the file format is formed to store a plurality of parameter sets, which is the file format of the image data file which stores RAW data corresponding to a subject image acquired through the imaging device. Furthermore, this configuration is done in which the data set is set and stored which associates the developed image or the in-process image corresponding to each of a plurality of parameter sets with the parameters and the sub-file formed only of the data set is created. Therefore, various image data processes can be done efficiently such as a process to create an image to which various parameters are applied, or a process to again acquire RAW data by the reverse development process to which the parameter is applied. An imaging apparatus and an image processing apparatus can be provided which implement processing of the taken image in high convenience.

It should be understood by those skilled in the art that various modifications combinations, sub-combinations and alterations may occur depending on design requirements and other factors insofar as they are within the scope of the appended claims or the equivalents thereof.

What is claimed is:

1. An imaging apparatus comprising:
an imaging part; and
a data processing part configured to:
create a RAW image file that stores RAW data acquired through the imaging part and a plurality of different parameter sets to be applied during a development process of the RAW data;
store the RAW image file in a storage part;
create a master file which stores the RAW data acquired through the imaging part, the plurality of different parameter sets to be applied during the development process of the RAW data, and sub-files which separately store each of the plurality of different parameter sets;
store the master file in the storage part;
execute the development process in which only one of the plurality of different parameter sets is applied to the RAW data to create an in-process image;
store the in-process image and the plurality of different parameter sets, including the only one of the plurality of different parameter sets applied during the creation of the in-process and at least one other one of the plurality of different parameter sets, in the RAW image file;
create a thumbnail image corresponding to the in-process image; and
store the thumbnail image in the RAW image file.

2. The imaging apparatus according to claim 1, wherein the data processing part is configured to store support information containing attribute information corresponding to the only one of the plurality of different parameter sets applied during the creation of the in-process image in the RAW image file.

3. The imaging apparatus according to claim 1, wherein the data processing part is configured to create a sub-file which stores a parameter set and at least any one of the image data created by the development process which applies the parameter set stored in the sub-file and thumbnail image data of the image data.

4. The imaging apparatus according to claim 1, wherein the data processing part is configured to store identification information which shows correspondence between the master file and the sub-files.

5. An image processing method comprising the steps of:
imaging;
creating a RAW image file that stores RAW data acquired during the imaging step and a plurality of different parameter sets to be applied during a development process of the RAW data;
storing the RAW image file in a storage part;
creating a master file which stores the RAW data acquired during the imaging step, the plurality of different parameter sets to be applied during the development process of the RAW data, and sub-files which separately store each of the plurality of different parameter sets;
storing the master file in the storage part;
executing the development process in which only one of the plurality of different parameter sets is applied to the RAW data to create an in-process image;
storing the in-process image and the plurality of different parameter sets, including the only one of the plurality of different parameter sets applied during the creation of the in-process and at least one other one of the plurality of different parameter sets, in the RAW image file;
creating a thumbnail image corresponding to the in-process image; and
storing the thumbnail image in the RAW image file.

6. The image processing method according to claim 5, comprising storing support information containing attribute information corresponding to the only one of the plurality of different parameter sets applied during the creation of the in-process image in the RAW image file.

7. The image processing method according to claim 5, further including creating a sub-file which stores a parameter set and at least any one of the image data created by the development process which applies the parameter set stored in the sub-file and thumbnail image data of the image data.

8. The image processing method according to claim 5, further including storing identification information which shows correspondence between the master file and the sub-files.

9. A non-transitory, computer-readable storage medium storing a program which, when executed by a processor, causes an imaging apparatus to perform an image processing method, the method comprising:
   imaging;
   creating a RAW image file that stores RAW data acquired during the imaging step and a plurality of different parameter sets to be applied during a development process of the RAW data;
   storing the RAW image file in a storage part;
   creating a master file which stores the RAW data acquired during the imaging step, the plurality of different parameter sets to be applied during the development process of the RAW data, and sub-files which separately store each of the plurality of different parameter sets;
   storing the master file in the storage part;
   executing the development process in which only one of the plurality of different parameter sets is applied to the RAW data to create an in-process image;
   storing the in-process image and the plurality of different parameter sets, including the only one of the plurality of different parameter sets applied during the creation of the in-process and at least one other one of the plurality of different parameter sets, in the RAW image file;
   creating a thumbnail image corresponding to the in-process image; and
   storing the thumbnail image in the RAW image file.

10. The non-transitory, computer-readable storage medium according to claim 9, wherein the method comprises storing support information containing attribute information corresponding to the only one of the plurality of different parameter sets applied during the creation of the in-process image in the RAW image file.

11. The non-transitory, computer-readable storage medium according to claim 9, wherein the method further includes creating a sub-file which stores a parameter set and at least any one of the image data created by the development process which applies the parameter set stored in the sub-file and thumbnail image data of the image data.

12. The non-transitory, computer-readable storage medium according to claim 9, wherein the method further includes storing identification information which shows correspondence between the master file and the sub-files.

* * * * *